US012804642B2

(12) United States Patent
Xiong et al.

(10) Patent No.: US 12,804,642 B2
(45) Date of Patent: Nov. 17, 2026

(54) CELL GROUPING FOR MULTI-CELL SCHEDULING

(71) Applicant: Intel Products IP LLC, Santa Clara, CA (US)

(72) Inventors: Gang Xiong, Beaverton, OR (US); Yingyang Li, Beijing (CN); Yi Wang, Beijing (CN); Viktor Sergeev, Lucan (IE)

(73) Assignee: Intel Products IP LLC, Santa Clara, CA (US)

( * ) Notice: Subject to any disclaimer, the term of this patent is extended or adjusted under 35 U.S.C. 154(b) by 297 days.

(21) Appl. No.: 18/570,487

(22) PCT Filed: Jan. 12, 2023

(86) PCT No.: PCT/US2023/010658
§ 371 (c)(1),
(2) Date: Dec. 14, 2023

(87) PCT Pub. No.: WO2023/137091
PCT Pub. Date: Jul. 20, 2023

(65) Prior Publication Data

US 2024/0292409 A1 Aug. 29, 2024

Related U.S. Application Data

(60) Provisional application No. 63/331,445, filed on Apr. 15, 2022, provisional application No. 63/308,758,
(Continued)

(51) Int. Cl.

| | |
|---|---|
| ***H04W 72/1268*** | (2023.01) |
| ***H04L 1/00*** | (2006.01) |
| ***H04W 72/232*** | (2023.01) |

(52) U.S. Cl.
CPC ....... *H04W 72/1268* (2013.01); *H04L 1/0027* (2013.01); *H04W 72/232* (2023.01)

(58) Field of Classification Search
CPC . H04W 76/15; H04W 72/21; H04W 72/1268; H04W 72/232; H04L 1/0027
See application file for complete search history.

(56) References Cited

U.S. PATENT DOCUMENTS 12,143,971 B2 * 11/2024 Chatterjee ......... H04W 72/0446
12,232,125 B2 * 2/2025 Yan .................... H04B 7/06964
(Continued)

FOREIGN PATENT DOCUMENTS

WO WO-2023137091 A1 7/2023

OTHER PUBLICATIONS

"International Application Serial No. PCT/US2023/010658, International Preliminary Report on Patentability mailed Jul. 25, 2024", 6 pgs.
(Continued)

*Primary Examiner* — Raj Jain
(74) *Attorney, Agent, or Firm* — Schwegman Lundberg & Woessner, P.A.

(57) ABSTRACT

A computer-readable storage medium stores instructions to configure a UE for multi-cell scheduling in a 5G NR network, and to cause the UE to perform operations including decoding higher layer signaling. The higher layer signaling indicates a number of cell groups configured to the UE. Each cell group of the number of cell groups includes at least two cells. DCI received in a PDCCH is decoded. The DCI includes a scheduling grant with time and frequency allocation for a PUSCH or a PDSCH in the number of cell groups configured to the UE. Uplink data transmissions via the PUSCH are scheduled in the number of cell groups or
(Continued)

downlink data receptions via the PDSCH are scheduled in the number of cell groups based on the scheduling grant.

9 Claims, 16 Drawing Sheets

Related U.S. Application Data filed on Feb. 10, 2022, provisional application No. 63/298,913, filed on Jan. 12, 2022.

(56) References Cited

U.S. PATENT DOCUMENTS

| | | | | |
|---|---|---|---|---|
| 12,356,339 | B2 * | 7/2025 | Lee | H04W 52/367 |
| 2015/0098427 | A1 * | 4/2015 | Barbieri | H04W 72/541<br>370/329 |
| 2022/0264545 | A1 * | 8/2022 | Wei | H04L 5/0091 |
| 2022/0386334 | A1 * | 12/2022 | Liu | H04L 5/001 |
| 2024/0031070 | A1 * | 1/2024 | Jung | H04W 72/232 |
| 2024/0292409 | A1 * | 8/2024 | Xiong | H04W 72/0453 |

OTHER PUBLICATIONS

"International Application Serial No. PCT/US2023/010658, International Search Report mailed May 2, 2023", 2 pgs.

"International Application Serial No. PCT/US2023/010658, Written Opinion mailed May 2, 2023", 4 pgs.

LG Electronics, "Discussion on multi-cell PDSCH scheduling via a single DCI", R1-2100886, 3GPP TSG RAN WG1 #104-e, (Jan. 19, 2021), 3 pgs.

Moderator (Lenovo), "Feature lead summary#3 for [104-e-NR-52-71GHz-02] on PDCCH monitoring enhancements", R1-2102242, 3GPP TSG RAN WG1 #104-e, (Feb. 8, 2021), 114 pgs.

Moderator (VIVO), "FL summary#2 of DCI-based power saving adaptation", R1-2112579, 3GPP TSG RAN WG1 #107-e, (Nov. 17, 2021), 110 pgs.

Qualcomm Incorporated, "Multi-cell PDSCH scheduling via a single DCI", 3GPP TSG RAN WG1 Meeting #104-e, R1-2101491, (Jan. 19, 2021), 11 pgs.

VIVO, "Discussion on joint scheduling1,", R1-2104392, RAN WG1 #105-e, (May 11, 2021), 17 pgs.

* cited by examiner

CELL GROUPING FOR MULTI-CELL SCHEDULING

PRIORITY CLAIM

This application is a U.S. National Stage Filing under 35 U.S.C. 371 from International Application No. PCT/US2023/010658, filed Jan. 12, 2023 and published in English as WO 2023/137091 on Jul. 20, 2023, which claims the benefit of priority to the following United States Provisional Patent Applications:

U.S. Provisional Patent Application No. 63/298,913, filed Jan. 12, 2022, and entitled "CELL GROUPING FOR MULTI-CELL SCHEDULING IN NEW RADIO SYSTEMS;"

U.S. Provisional Patent Application No. 63/308,758, filed Feb. 10, 2022, and entitled "CHANNEL STATE INFORMATION (CSI) REPORTING FOR PHYSICAL UPLINK SHARED CHANNEL (PUSCH) SCHEDULING ON MULTIPLE CELLS;" and U.S. Provisional Patent Application No. 63/331,445, filed Apr. 15, 2022, and entitled "CELL GROUPING FOR MULTI-CELL SCHEDULING IN NEW RADIO SYSTEMS."

Each of the patent applications listed above is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, (MulteFire, LTE-U), and fifth-generation (5G) networks including 5G new radio (NR) (or 5G-NR) networks, 5G-LTE networks such as 5G NR unlicensed spectrum (NR-U) networks and other unlicensed networks including Wi-Fi, CBRS (OnGo), etc. Other aspects are directed to techniques for channel state information (CSI) reporting for physical uplink shared channel (PUSCH) scheduling on multiple cells. Additional aspects are related to techniques for cell grouping for multi-cell scheduling in NR systems.

BACKGROUND

Mobile communications have evolved significantly from early voice systems to today's highly sophisticated integrated communication platform. With the increase in different types of devices communicating with various network devices, the usage of 3GPP LTE systems has increased. The penetration of mobile devices (user equipment or UEs) in modern society has continued to drive demand for a wide variety of networked devices in many disparate environments. Fifth-generation (5G) wireless systems are forthcoming and are expected to enable even greater speed, connectivity, and usability. Next-generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As the current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. Further enhanced operation of LTE and NR systems in the licensed, as well as unlicensed spectrum, is expected in future releases and 5G systems. Such enhanced operations can include techniques for CSI reporting for PUSCH scheduling on multiple cells and techniques for cell grouping for multi-cell scheduling in NR systems.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
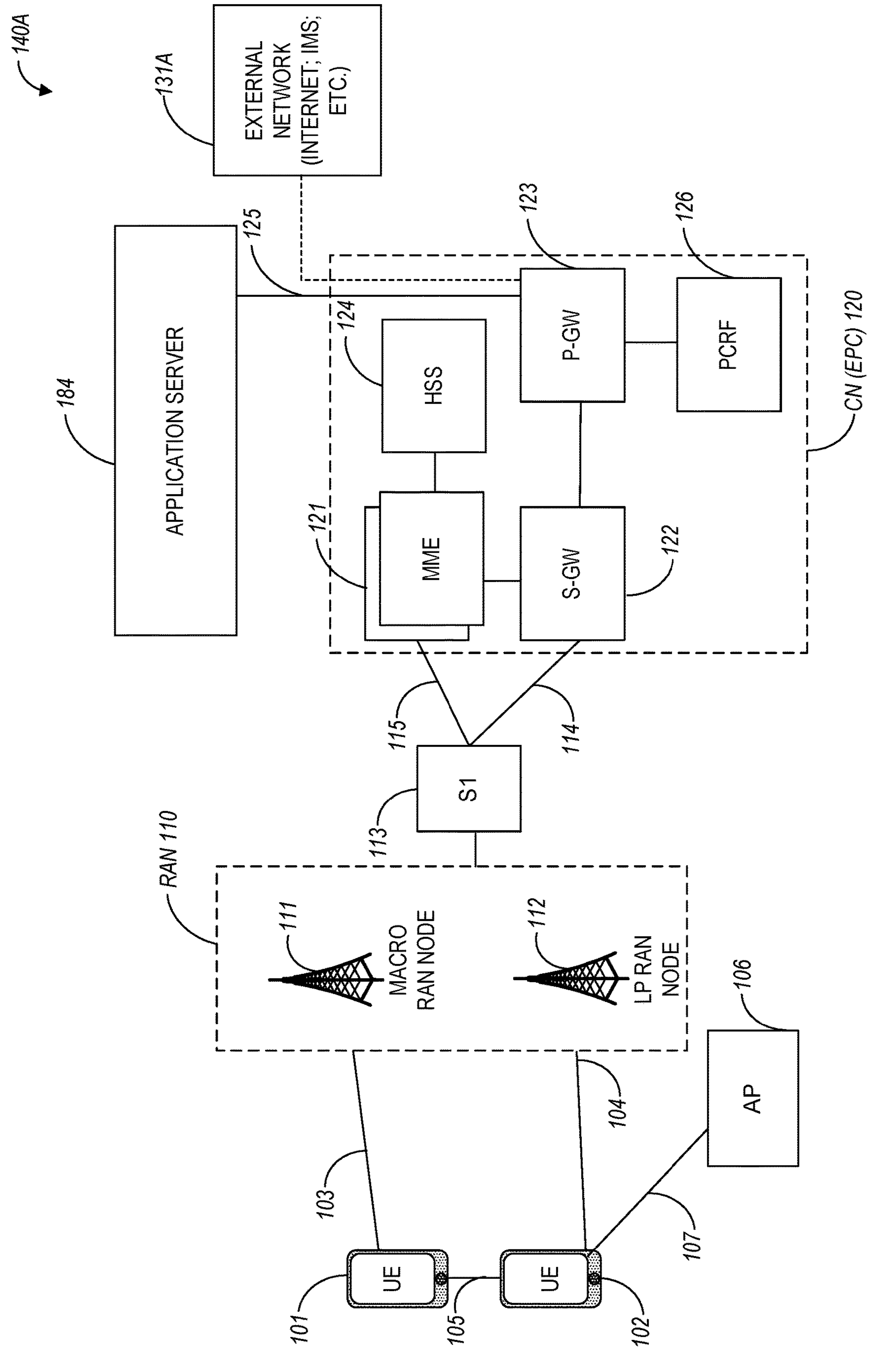
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe), or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively coupled, with a radio access network (RAN) 110. The RAN 110 may be, for example, a Universal Mobile Telecommunications System (UMTS), an Evolved Universal Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable connections 103 and 104. These access nodes (ANs) can be referred to as base stations (BSs), NodeBs, evolved NodeBs (eNBs), Next Generation NodeBs (gNBs), RAN network nodes, and the like, and can comprise ground stations (e.g., terrestrial access points) or satellite stations providing coverage within a geographic area (e.g., a cell). In some aspects, communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112 or an unlicensed spectrum based secondary RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, the radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

Figure 1B:
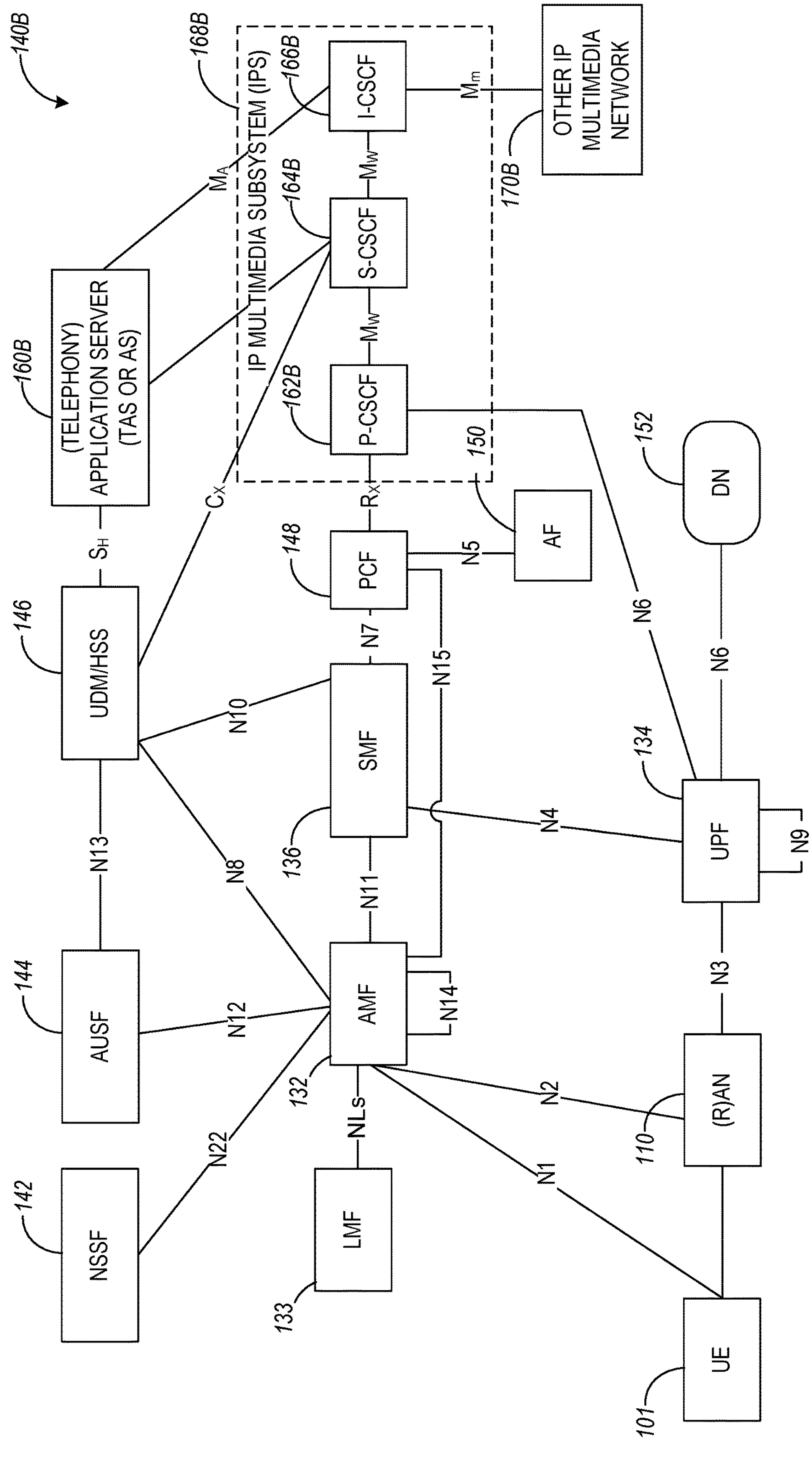
FIG. 1B and FIG. 1C illustrate a non-roaming 5G system architecture in accordance with some aspects.
Figure 1C:
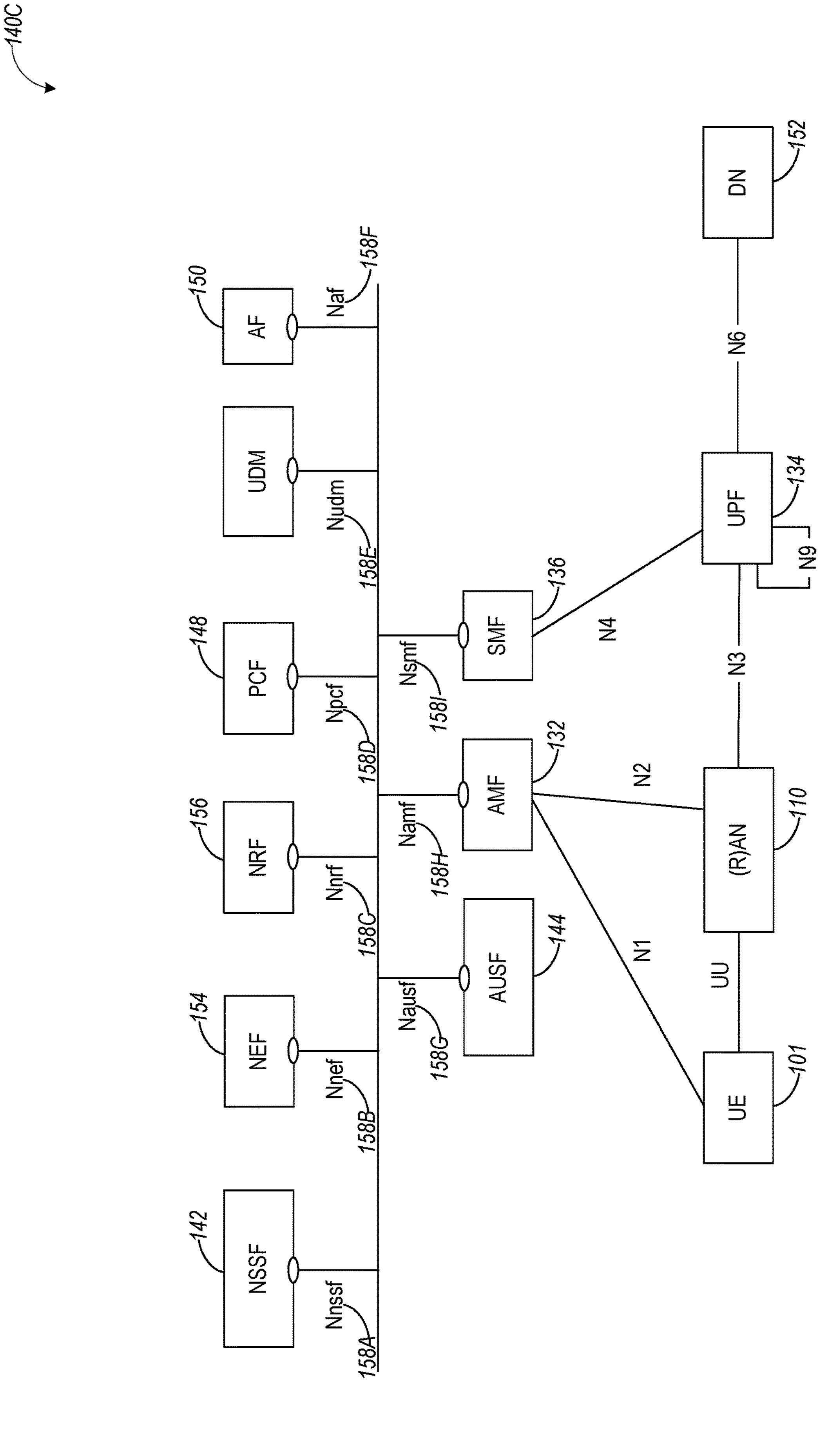

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in FIGS. 1B-1C). In this aspect, the S1 interface 113 is split into two parts: the S1-U interface

114, which carries user traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, the capacity of the equipment, the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and route data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, a RAN network node, and so forth. In some aspects, a gNB can be a master node (MN) and NG-eNB can be a secondary node (SN) in a 5G architecture. In some aspects, the master/primary node may operate in a licensed band and the secondary node may operate in an unlicensed band.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, location management function (LMF) 133, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The LMF 133 may be used in connection with 5G positioning functionalities. In some aspects, LMF 133 receives measurements and assistance information from the next-generation radio access network (NG-RAN) 110 and the mobile device (e.g., UE 101) via the AMF 132 over the NLs interface to compute the position of the UE 101. In some aspects, NR positioning protocol A (NRPPa) may be used to carry the positioning information between NG-RAN and LMF 133 over a next-generation control plane interface (NG-C). In some aspects, LMF 133 configures the UE using the LTE positioning protocol (LPP) via AMF 132. The NG RAN 110 configures the UE 101 using radio resource control (RRC) protocol over LTE-Uu and NR-Uu interfaces.

In some aspects, the 5G system architecture 140B configures different reference signals to enable positioning measurements. Example reference signals that may be used for positioning measurements include the positioning reference signal (NR PRS) in the downlink and the sounding reference signal (SRS) for positioning in the uplink. The downlink positioning reference signal (PRS) is a reference signal configured to support downlink-based positioning methods.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDMIHSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 1581 (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

FIGS. 2-13 illustrate various systems, devices, and components that may implement aspects of disclosed embodiments in different communication systems, such as 5G-NR networks including 5G non-terrestrial networks (NTNs). UEs, base stations (such as gNBs), and/or other nodes (e.g., satellites or other NTN nodes) discussed herein can be configured to perform the disclosed techniques.

Figure 2:
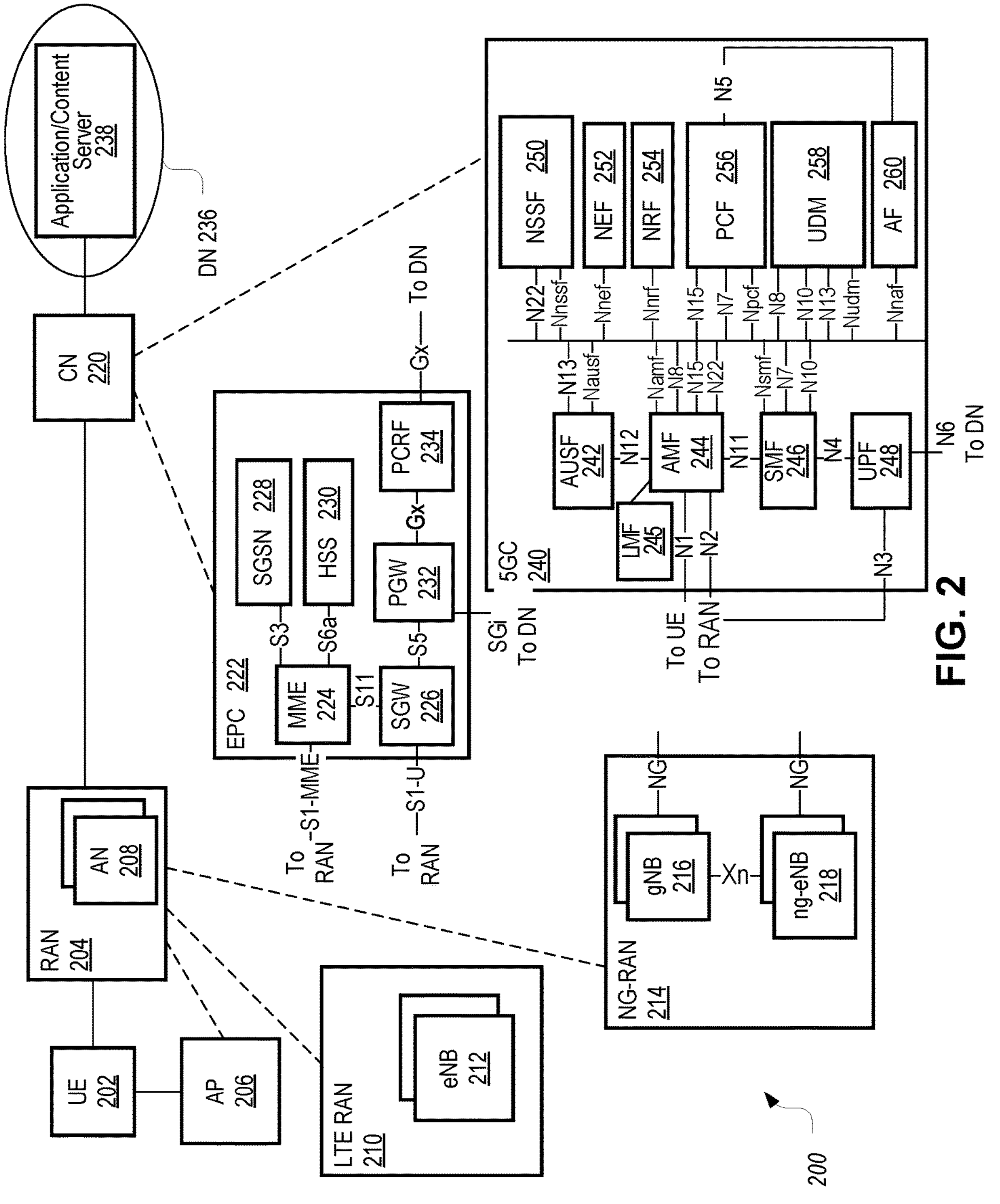
FIG. 2, FIG. 3, and FIG. 4 illustrate various systems, devices, and components that may implement aspects of disclosed embodiments.

FIG. 2 illustrates a network 200 in accordance with various embodiments. The network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be, but is not limited to, a smartphone, tablet computer, wearable computing device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, network 200 may include a plurality of UEs coupled directly with one another via a sidelink interface. The UEs may be M2M/D2D devices that communicate using physical sidelink channels such as but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 configured by the RAN 204 to utilize both cellular radio resources and WLAN resources.

The RAN 204 may include one or more access nodes, for example, access node (AN) 208. AN 208 may terminate air-interface protocols for the UE 202 by providing access stratum protocols including RRC, Packet Data Convergence Protocol (PDCP), Radio Link Control (RLC), MAC, and L1 protocols. In this manner, the AN 208 may enable data/voice connectivity between the core network (CN) 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low-power base station for providing femtocells, picocells, or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second AN may be a secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/SCells. Before accessing the unlicensed spectrum, the nodes may perform medium/carrier-sensing operations based on, for example, a listen-before-talk (LBT) protocol.

In V2X scenarios, the UE 202 or AN 208 may be or act as a roadside unit (RSU), which may refer to any transportation infrastructure entity used for V2X communications. An RSU may be implemented in or by a suitable AN or a stationary (or relatively stationary) UE. An RSU implemented in or by a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, and media, as well as applications/software to sense and control ongoing vehicular and pedestrian traffic. The RSU may provide very low latency communications required for high-speed events, such as crash avoidance, traffic warnings, and the like. Additionally, or alternatively, the RSU may provide other cellular/WLAN communications services. The components of the RSU may be packaged in a weatherproof enclosure suitable for outdoor installation and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: sub-carrier spacing (SCS) of 15 kHz; CP-OFDM waveform for downlink (DL) and SC-FDMA waveform for uplink (UL); turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operate on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface but may connect with a UE via an LTE air interface. The gNB 216 and the ng-eNB 218 may connect over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN214 and an AMF 244 (e.g., N2 interface).

The NG-RAN 214 may provide a 5G-NR air interface with the following characteristics: variable SCS; CP-OFDM for DL, CP-OFDM, and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS but may use PBCH DMRS for PBCH demodulation; PTRS for phase tracking for PDSCH and tracking reference signal for time tracking. The 5G-NR air interface may operate on FR1 bands that include sub-6 GHz bands or FR2 bands that include bands from 24.25 GHz to 52.6 GHz. The 5G-NR air interface may include a synchronization signal and physical broadcast channel (SS/PBCH) block (SSB) which is an area of a downlink resource grid that includes PSS/SSS/PBCH.

In some embodiments, the 5G-NR air interface may utilize BWPs (bandwidth parts) for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amounts of frequency resources (for example, PRBs) to support data transmission under different traffic loading scenarios. A BWP containing a smaller number of PRBs can be used for data transmission with a small traffic load while allowing power saving at the UE 202 and in some cases at the gNB 216. A BWP containing a larger number of PRBs can be used for scenarios with higher traffic loads.

The RAN 204 is communicatively coupled to CN 220 which includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be connected to the LTE radio network as part of the Enhanced Packet System (EPS) 222, which may also be referred to as an EPC (or enhanced packet core). The EPC 222 may include MME 224, SGW 226, SGSN 228, HSS 230, PGW 232, and PCRF 234 coupled with one another over interfaces (or "reference points") as shown. Functions of the elements of the EPC 222 may be briefly introduced as follows.

The MME 224 may implement mobility management functions to track the current location of the UE 202 to facilitate paging, bearer activation/deactivation, handovers, gateway selection, authentication, etc.

The SGW 226 may terminate an S1 interface toward the RAN and route data packets between the RAN and the EPC 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track the location of the UE 202 and perform security functions and access control. In addition, the SGSN 228 may perform inter-EPC node signaling for mobility between different RAT networks; PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable the transfer of subscription and authentication data for authenticating/authorizing user access to the LTE CN 220.

The PGW 232 may terminate an SGi interface toward a data network (DN) 236 that may include an application/content server 238. The PGW 232 may route data packets between the LTE CN 220 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 236 may be an operator external public, a private PDN, or an intra-operator packet data network, for example, for the provision of IMS services. The PGW 232 may be coupled with a PCRF 234 via a Gx reference point.

The PCRF 234 is the policy and charging control element of the LTE CN 220. The PCRF 234 may be communicatively coupled to the app/content server 238 to determine appropriate QoS and charging parameters for service flows. The PCRF 234 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for the authentication of UE 202 and handle authentication-related functionality. The AUSF 242 may facilitate a common authentication framework for various access types. In addition to communicating with other elements of the 5GC 240 over reference points as shown, the AUSF 242 may exhibit a Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling, and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM may refer to the management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point of interconnecting to data network 236, and a branching point to support multi-homed PDU sessions. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine allowed NSSAI and the mapping to the subscribed S-NSSAIs if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for the third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on the exposed capabilities of other NFs. This information may be stored at the NEF 252 as structured data, or a data storage NF using standardized interfaces. The stored information can then be re-exposed by the NEF 252 to other NFs and AFs, or used for other purposes such as analytics. Additionally, the NEF 252 may exhibit a Nnef service-based interface.

The NRF 254 may support service discovery functions, receive NF discovery requests from NF instances, and provide information on the discovered NF instances to the NF instances. NRF 254 also maintains information on available NF instances and their supported services. As used herein, the terms "instantiate," "instantiation," and the like may refer to the creation of an instance, and an "instance" may refer to a concrete occurrence of an object, which may occur, for example, during the execution of program code. Additionally, the NRF 254 may exhibit the Nnrf service-based interface.

The PCF 256 may provide policy rules to control plane functions to enforce them, and may also support a unified policy framework to govern network behavior. The PCF 256 may also implement a front end to access subscription information relevant to policy decisions in a UDR of the UDM 258. In addition to communicating with functions over reference points as shown, the PCF 256 exhibits an Npcf service-based interface.

The UDM 258 may handle subscription-related information to support the network entities' handling of communication sessions and may store the subscription data of UE 202. For example, subscription data may be communicated via an N8 reference point between the UDM 258 and the AMF 244. The UDM 258 may include two parts, an application front end, and a UDR. The UDR may store subscription data and policy data for the UDM 258 and the PCF 256, and/or structured data for exposure and application data (including PFDs for application detection, and application request information for multiple UEs 202) for the NEF 252. The Nudr service-based interface may be exhibited by the UDR to allow the UDM 258, PCF 256, and NEF 252 to access a particular set of the stored data, as well as to read, update (e.g., add, modify), delete, and subscribe to the notification of relevant data changes in the UDR. The UDM may include a UDM-FE, which is in charge of processing credentials, location management, subscription management, and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/3rd party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re)selection and traffic routing. Based on operator deployment, when AF 260 is considered to be a trusted entity, the network operator may permit AF 260 to interact directly with relevant NFs. Additionally, the AF 260 may exhibit a Naf service-based interface.

The data network 236 may represent various network operator services, Internet access, or third-party services that may be provided by one or more servers including, for example, application/content server 238.

In some aspects, network 200 is configured for NR positioning using the location management function (LMF) 245, which can be configured as an LMF node or as functionality in a different type of node. In some embodiments, LMF 245 is configured to receive measurements and assistance information from NG-RAN 214 and UE 202 via the AMF 244 (e.g., using an NLs interface) to compute the position of the UE. In some embodiments, NR positioning protocol A (NRPPa) protocol can be used for carrying the positioning information between NG-RAN 214 and LMF 245 over a next-generation control plane interface (NG-C). In some embodiments, LMF 245 configures the UE 202 using LTE positioning protocol (LPP) (e.g., LPP-based communication link) via the AMF 244. In some aspects, NG RAN 214 configures the UE 202 using, e.g., radio resource control (RRC) protocol signaling over, e.g., LTE-Uu and NR-Uu interfaces. In some aspects, UE 202 uses the LTE-Uu interface to communicate with the ng-eNB 218 and the NR-Uu interface to communicate with the gNB 216. In some aspects, ng-eNB 216 and gNB 216 use NG-C interfaces to communicate with the AMF 244.

In some embodiments, the following reference signals can be used to achieve positioning measurements in NR communication networks: NR positioning reference signal (NR PRS) in the downlink and sounding reference signal (SRS) for positioning in the uplink. The downlink positioning reference signal (PRS) can be used as a reference signal supporting downlink-based positioning techniques. In some aspects, the entire NR bandwidth can be covered by transmitting PRS over multiple symbols that can be aggregated to accumulate power.

Figure 3:
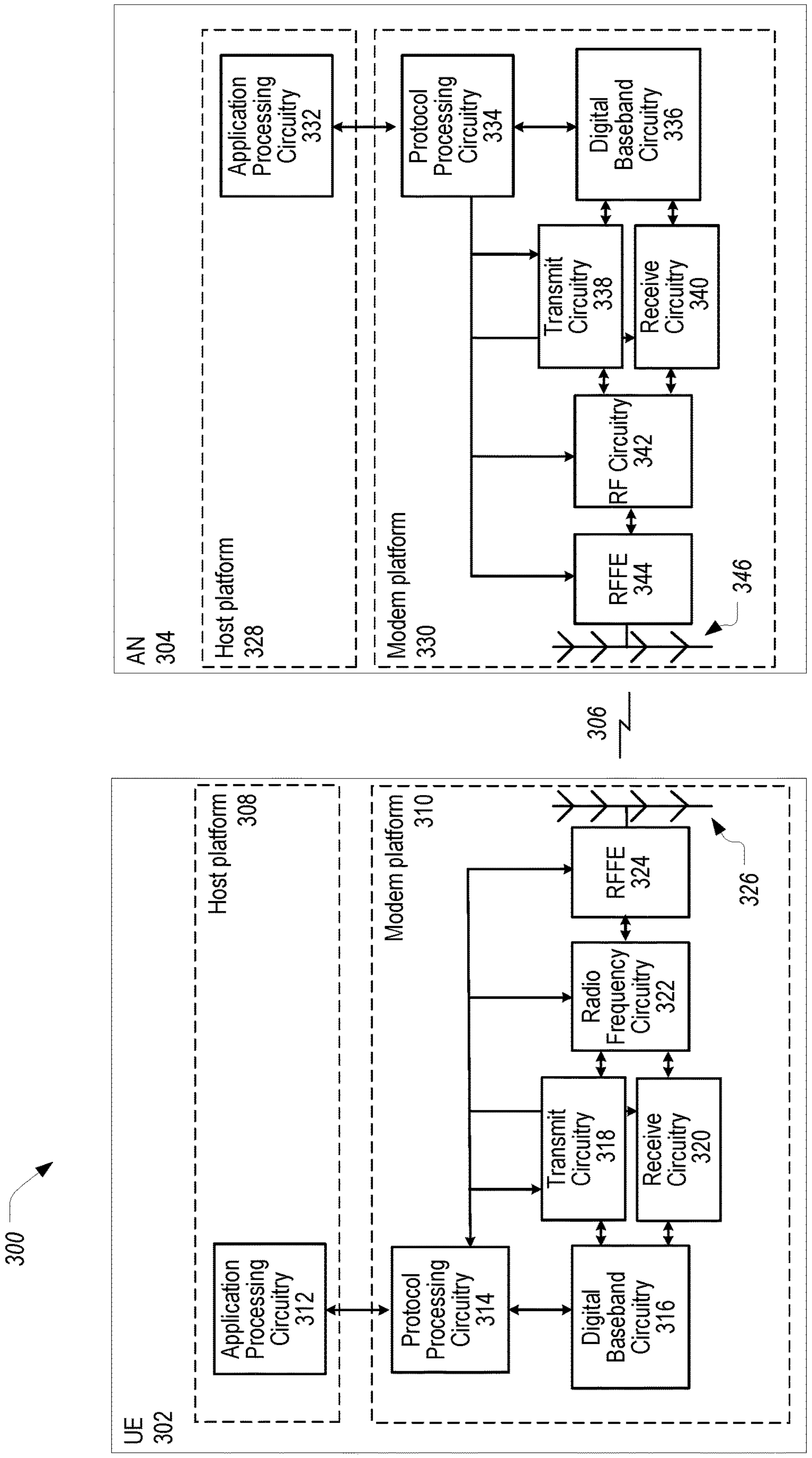

FIG. 3 schematically illustrates a wireless network 300 in accordance with various embodiments. The wireless network 300 may include a UE 302 in wireless communication with AN 304. The UE 302 and AN 304 may be similar to, and substantially interchangeable with, like-named components described elsewhere herein.

The UE 302 may be communicatively coupled with the AN 304 via connection 306. Connection 306 is illustrated as an air interface to enable communicative coupling and can be consistent with cellular communications protocols such as an LTE protocol or a 5G NR protocol operating at mmWave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more layer operations to facilitate the transmission or reception of data over connection 306. The layer operations implemented by the protocol processing circuitry 314 may include, for example, MAC, RLC, PDCP, RRC, and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318 receive circuitry 320, RF circuitry 322, RFFE 324, and antenna panels 326 (referred to generically as "transmit/receive components") may be specific to details of a specific implementation such as, for example, whether the communication is TDM or FDM, in mmWave or sub-6 GHz frequencies, etc. In some embodiments, the transmit/receive components may be arranged in multiple parallel transmit/receive chains, may be disposed of in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 302 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with the like-named components of the UE 302. In addition to performing data transmission/reception as described above, the components of the AN 304 may perform various logical functions that include, for example, RNC functions such as radio bearer management, uplink and downlink dynamic radio resource management, and data packet scheduling.

Figure 4:
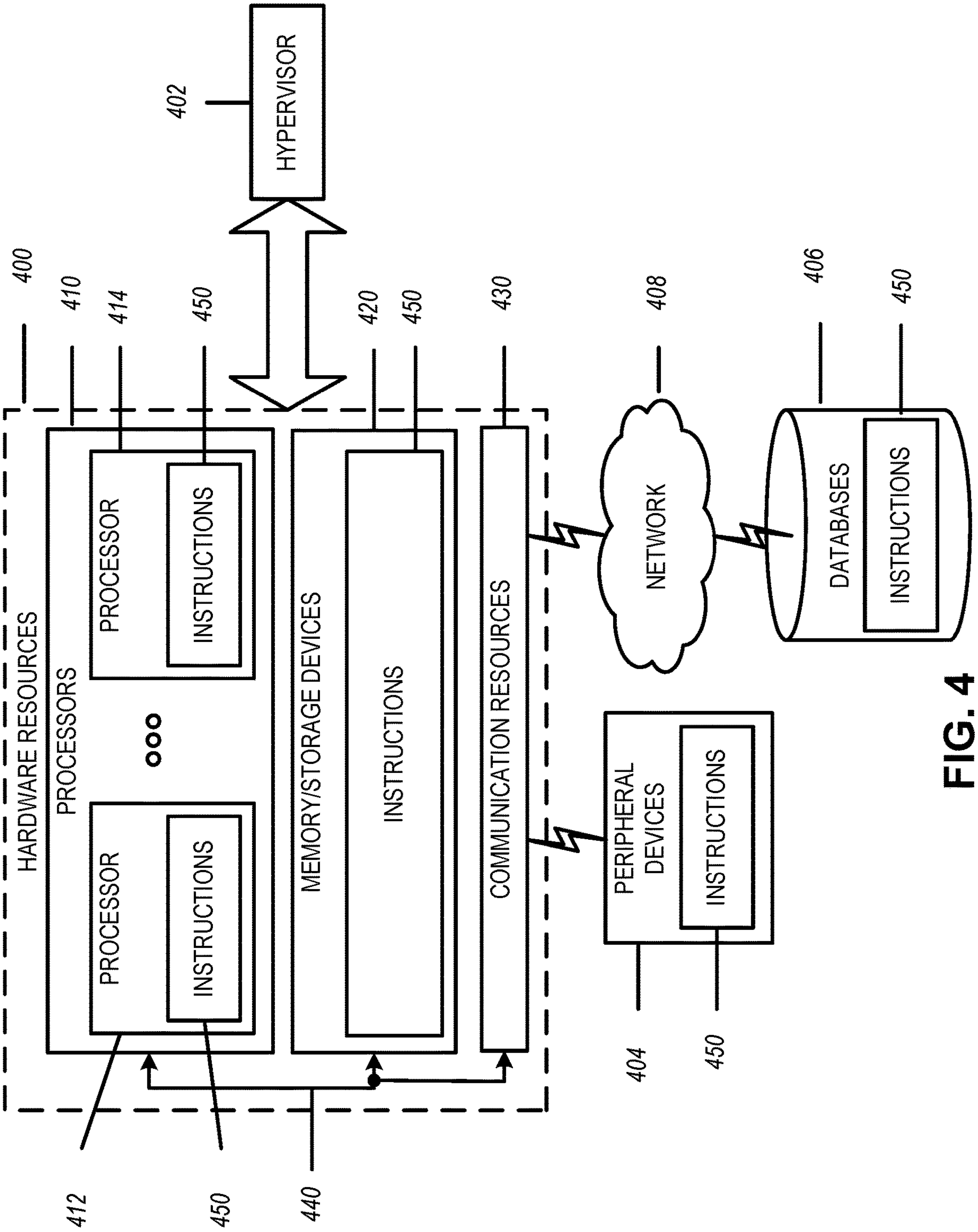

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/sub-slices to utilize the hardware resources 400.

The one or more processors 410 may include, for example, a processor 412 and a processor 414. The one or more processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include a main memory, disk storage, or any suitable combination thereof. The memory/storage devices 420 may include but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the one or more processors 410 to perform any one or more of the methodologies discussed herein. The instructions 450 may reside, completely or partially, within at least one of the one or more processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of the one or more processors 410, the memory/storage devices 420, the peripheral devices 404, and the databases 406 are examples of computer-readable and machine-readable media.

For one or more embodiments, at least one of the components outlined in one or more of the preceding figures may be configured to perform one or more operations, techniques, processes, and/or methods as outlined in the example sections below. For example, baseband circuitry associated with one or more of the preceding figures may be configured to operate in accordance with one or more of the examples set forth below. For another example, circuitry associated with a UE, base station, satellite, network element, etc. as described above in connection with one or more of the preceding figures may be configured to operate in accordance with one or more of the examples set forth below in the example section.

The term "application" may refer to a complete and deployable package, or environment to achieve a certain function in an operational environment. The term "AI/ML application" or the like may be an application that contains some artificial intelligence (AI)/machine learning (ML) models and application-level descriptions. In some embodiments, an AI/ML application may be used for configuring or implementing one or more of the disclosed aspects.

The term "machine learning" or "ML" refers to the use of computer systems implementing algorithms and/or statistical models to perform a specific task(s) without using explicit instructions but instead relying on patterns and inferences. ML algorithms build or estimate mathematical model(s) (referred to as "ML models" or the like) based on sample data (referred to as "training data," "model training information," or the like) to make predictions or decisions without being explicitly programmed to perform such tasks. Generally, an ML algorithm is a computer program that learns from experience concerning some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principal component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific to an ML-assisted solution; an ML pipeline may include one or several data sources in a data pipeline, a model training pipeline, a model evaluation pipeline, and an actor. The "actor" is an entity that hosts an ML-assisted solution using the output of the ML model inference). The term "ML training host" refers to an entity, such as a network function, that hosts the training of the model. The term "ML inference host" refers to an entity, such as a network function, that hosts the model during inference mode (which includes both the model execution as well as any online learning if applicable). The ML host informs the actor about the output of the ML algorithm, and the actor decides on an action (an "action" is performed by an actor as a result of the output of an ML-assisted solution). The term "model inference information" refers to information used as an input to the ML model for determining inference(s); the data used to train an ML model and the data used to determine inferences may overlap, however, "training data" and "inference data" refer to different concepts.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

NR supports a wide range of spectrums in different frequency ranges. It is expected that there will be increasing availability of spectrum in the market for 5G Advanced possibly due to re-farming from the bands originally used for previous cellular generation networks. Especially for frequency range one (FR1) bands, the available spectrum blocks tend to be more fragmented and scattered with a narrower bandwidth. For frequency range two (FR2) bands and some FR1 bands, the available spectrum can be wider such that intra-band multi-carrier operation is necessary. To meet different spectrum needs, it is important to ensure that these scattered spectrum bands or wider bandwidth spectrum can be utilized in a more spectral/power efficient and flexible manner, thus providing higher throughput and decent coverage in the network.

One motivation is to increase flexibility and spectral/power efficiency in scheduling data over multiple cells including intra-band cells and inter-band cells. The current scheduling mechanism only allows scheduling of single cell physical uplink shared channel (PUSCH)/physical downlink shared channel (PDSCH) per a scheduling downlink control information (DCI). With more available scattered spectrum bands or wider bandwidth spectrum, the need for simultaneous scheduling of multiple cells is expected to be increasing. To reduce the control overhead, it is beneficial to extend from single-cell scheduling to multi-cell PUSCH/PDSCH scheduling with a single scheduling DCL More specifically, a DCI is used to schedule PDSCH or PUSCH transmissions in more than one cell or component carrier (CC), where each PDSCH or PUSCH is scheduled in one cell or CC.

Figure 5:
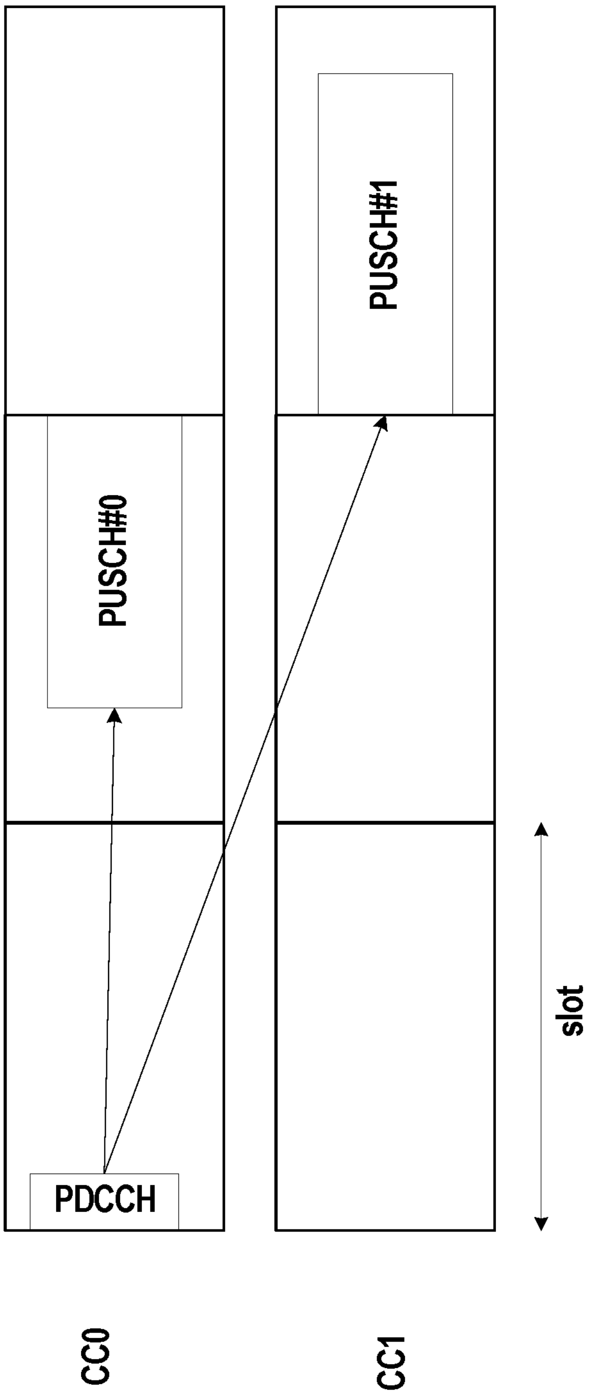
FIG. 5 is a diagram of multi-cell scheduling for PUSCH, in accordance with some aspects.

FIG. 5 illustrates one example of multi-cell scheduling for PUSCHs. In the example, one physical downlink control channel (PDCCH) is used to schedule two PUSCHs in two different cells, i.e., PUSCH #0 in CC0 and PUSCH #1 in CC1. Further, PUSCH #0 and #1 are scheduled in two different slots with different time domain resource allocations in a slot.

As defined in NR, aperiodic channel state information (A-CSI) is triggered by a DCI with an uplink grant for scheduling a PUSCH. Further, the A-CSI report configuration could include multiple resource sets for channel measurements, each with its own set of reference signals including channel state information reference signal (CSI-RS). Each resource set is associated with a specific value of the CSI request field in the DCI. Note that the A-CSI report configuration may include the CSI measurement setting from another cell.

In case of multi-cell scheduling, the UE may need to consider the CSI reporting for different combinations for cells, which would increase UE implementation complexity substantially. To address this issue, certain mechanisms may need to be defined for the CSI reporting in case of multi-cell scheduling.

The disclosed techniques include mechanisms on CSI reporting for PUSCH scheduling on multiple component carriers. In particular, the disclosed techniques include A-CSI multiplexing on PUSCH for multi-cell scheduling, CSI report configuration for multi-cell scheduling, uplink shared channel (UL-SCH) indicator, downlink assignment indication (DAI) and beta_offset indicator for multi-cell scheduling, and sounding reference signal (SRS) request for multi-cell scheduling.

A-CSI Multiplexing on PUSCH for Multi-Cell Scheduling

In NR, aperiodic channel state information (A-CSI) is triggered by a DCI with an uplink grant for scheduling a PUSCH. Further, the A-CSI report configuration could include multiple resource sets for channel measurements, each with its own set of reference signals including channel state information reference signal (CSI-RS). Each resource set is associated with a specific value of the CSI request field in the DCI. Note that the A-CSI report configuration may include the CSI measurement setting from another cell.

In case of multi-cell scheduling, the UE may need to consider the CSI reporting for different combinations of cells, which would increase UE implementation complexity substantially. To address this issue, certain mechanisms may need to be defined for the CSI reporting in case of multi-cell scheduling.

Embodiments of A-CSI multiplexing on PUSCH for multi-cell scheduling are provided as follows:

In some embodiments, for multi-cell PUSCH scheduling, when a CSI request is triggered in the DCI, aperiodic channel state information (A-CSI) report is carried in a reference PUSCH in a cell when single cell group is scheduled or N reference PUSCHs when N cell groups are scheduled. In the latter case, a PUSCH in a cell group is used to carry an A-CSI report. A cell group may include one or more than one cells that are scheduled with the same scheduling information in the DCI.

In one example, when N=2, the A-CSI report is carried in two PUSCHs in two cells, where each PUSCH carrying the A-CSI report is in a cell. The PUSCH in the cell can be determined in accordance with a predefined rule.

In some embodiments, the reference PUSCH in the cell is determined in accordance with the cell with the lowest serving cell index, largest serving cell index, second lowest serving cell index, or second largest serving cell index in a cell group or all scheduled cells that satisfy the multiplexing timeline. The multiplexing timeline is defined in Section 9.2.5 in the 3GPP TS 38.213.

Figure 6:
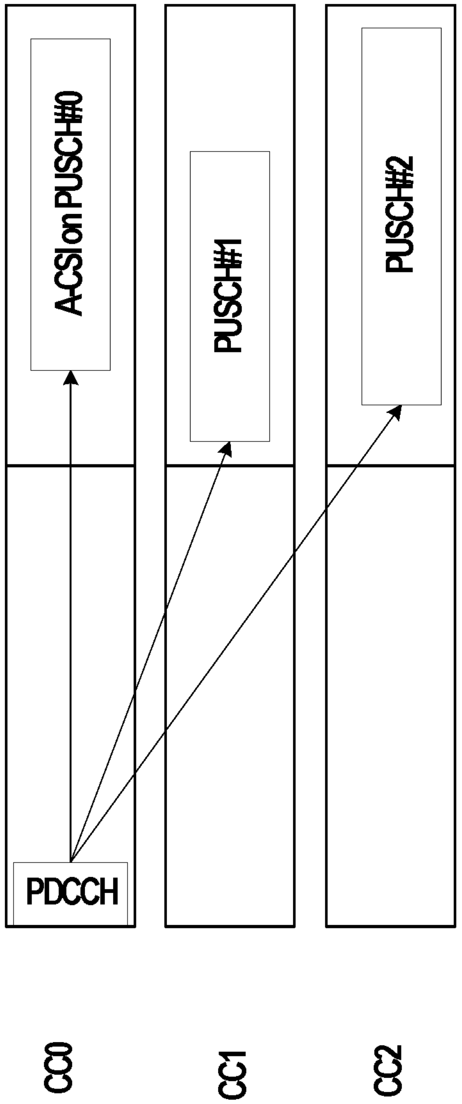
FIG. 6 is a diagram of aperiodic CSI (A-CSI) on PUSCH for multi-cell scheduling with the lowest serving cell index, in accordance with some aspects.

FIG. 6 illustrates one example of A-CSI on PUSCH for multi-cell scheduling. In the example, a DCI with multi-cell scheduling is used to schedule 3 PUSCHs in 3 cells within a single cell group. In addition, all the PUSCHs satisfy the multiplexing timeline. Based on this option, the A-CSI report is multiplexed on the PUSCH in CC with the lowest serving cell index, i.e., CC #0.

In some embodiments, the reference PUSCH in the cell is determined in accordance with the cell where the scheduling PDCCH is located, if applicable. In this case, the same cell is used for the PDCCH and PUSCH carrying the A-CSI report. If the scheduled cell is different from the cell where the scheduling PDCCH is located, the above embodiment can be applied, e.g., the cell with the lowest serving cell index.

In some embodiments, the reference PUSCH in the cell is determined in accordance with the PUSCH with the smallest SCS in a cell group or all scheduled cells that satisfy the multiplexing timeline. In case when multiple PUSCHs have the same SCS in different cells, the above options can be applied, e.g., the PUSCH in the cell is determined in accordance with the cell with the lowest serving cell index or largest serving cell index in a cell group or all scheduled cells that satisfies the multiplexing timeline.

In another embodiment of the invention, the reference PUSCH in the cell is determined in accordance with the PUSCH with the earliest starting time, last starting time, second earliest starting time, or second to last starting time in a cell group or all scheduled cells that satisfies the multiplexing timeline. In case when multiple PUSCHs have the same starting times in different cells, the above options can be applied, e.g., the reference PUSCH in the cell is determined in accordance with the cell with the lowest serving cell index or largest serving cell index in a cell group or all scheduled cells that satisfies the multiplexing timeline.

Figure 7:
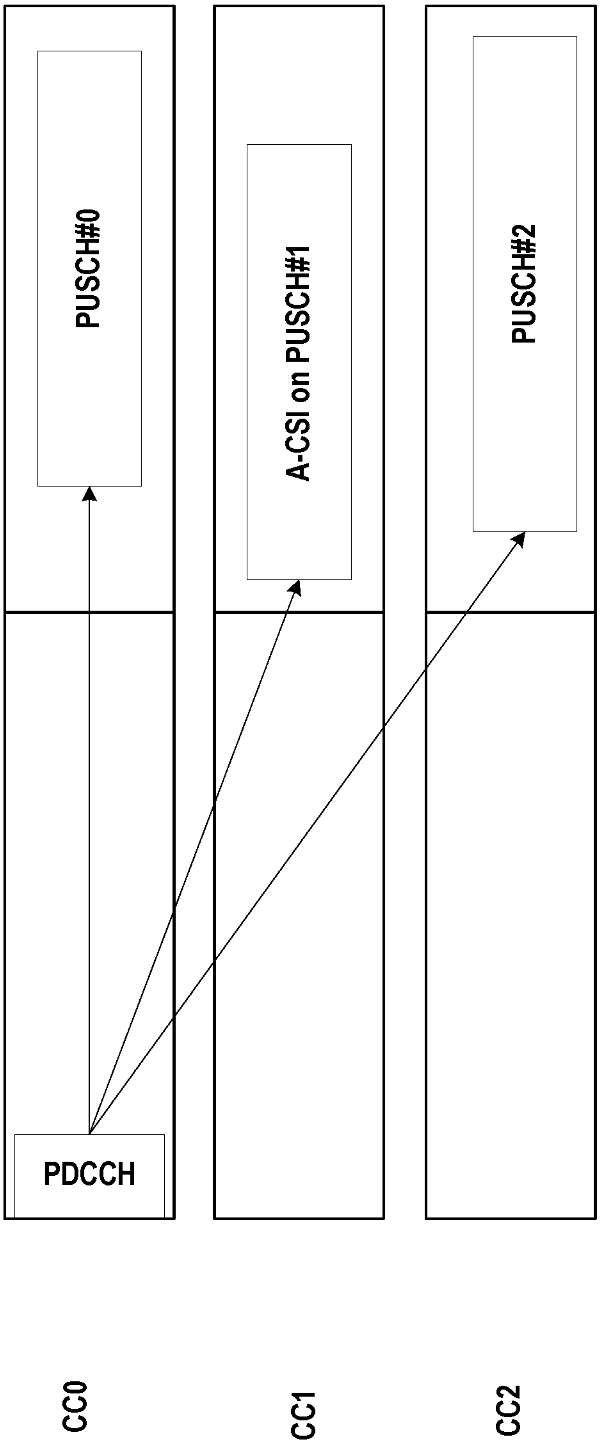
FIG. 7 is a diagram of A-CSI on PUSCH for multi-cell scheduling with the earliest starting time, in accordance with some aspects.

FIG. 7 illustrates one example of A-CSI on PUSCH for multi-cell scheduling. In the example, a DCI with multi-cell scheduling is used to schedule 3 PUSCHs in 3 cells within a single cell group. In addition, all the PUSCHs satisfy the multiplexing timeline. Based on this option, the A-CSI report is multiplexed on the PUSCH in CC with the earliest starting time, i.e., CC #1.

In some embodiments, the reference PUSCH in the cell is determined in accordance with a cell in a cell group with the lowest cell group index or largest cell group index. If there are multiple cells in a cell group, the above embodiment can be applied, e.g., the cell with the lowest serving cell index in the cell group.

In the aforementioned embodiments, the reference PUSCH may be the configured PUSCH, scheduled PUSCH, or valid PUSCH in the case of multi-cell PUSCH scheduling. In some aspects, configured PUSCH indicates the PUSCH which is configured by dedicated RRC signaling for carrying A-CSI report. This can be configured per scheduling cell in case of multi-cell scheduling.

In some aspects, valid PUSCH indicates that PUSCH is transmitted, or not overlapping with a DL symbol indicated by tdd-UL-DL-ConfigurationCommon or tdd-UL-DL-ConfigurationDedicated if provided, or a symbol of an SS/PBCH block with an index provided by ssb-PositionsInBurst. In some embodiments, valid PUSCH indicates that PUSCH is transmitted, or not overlapping with a DL symbol indicated by tdd-UL-DL-ConfigurationCommon or tdd-UL-DL-ConfigurationDedicated if provided, or a symbol of an SS/PBCH block with an index provided by ssb-PositionsInBurst or by pdcch-ConfigSIB1 in MIB for a CORESET for Type0-PDCCH CSS set.

CSI Report Configuration for Multi-Cell Scheduling

Embodiments of CSI report configuration for multi-cell scheduling are provided as follows:

In some embodiments, for multi-cell scheduling, a single CSI request field is included in the DCI to trigger CSI measurement configured in all scheduled or configured cells for multi-cell scheduling.

In some embodiments, the UE performs CSI measurement on the cells in accordance with the union of the CSI reporting configuration in all scheduled or configured cells for multi-cell scheduling. For a first scheduled cell, CSI measurement may be triggered and performed in a second cell, which may not be in the scheduled cell for multi-cell scheduling.

Further, when the size of the indicated single CSI request field in the DCI is greater than the determined CSI request field for a scheduled cell, truncation is applied on the indicated single CSI request field size to match with the determined CSI request field for the scheduled cell. In this case, UE uses several least significant bits of the indicated single CSI request field which is equal to the one for the determined CSI request field size for a scheduled cell.

In addition, when the size of the indicated single CSI request field in the DCI is smaller than the determined CSI request field for a scheduled cell, zero padding is applied on the indicated single CSI request field size to match with the determined CSI request field for the scheduled cell. In this case, UE prepends zeros to the indicated single CSI request field until the size is equal to the one for the determined CSI request field size for a scheduled cell.

In some embodiments, one single-bit parameter may be configured as part of CSI-ReportConfigs, CSI-AperiodicTriggerStateList, or CSI-ResourceConfig to indicate whether the CSI measurement for a cell is performed in case of multi-cell scheduling. In particular, a bit "1" may indicate that CSI measurement is triggered for a cell while a bit "0" may indicate that CSI measurement is not triggered for a cell.

In some embodiments, an additional index corresponding to a CSI-ReportConfig may be configured. If multiple CSI-ReportConfigs with the same value of the index are requested, then only one CSI-ReportConfig is considered for reporting by the UE. The considered CSI-ReportConfig can be determined in accordance with at least one or more following options:

(a) CSI-ReportConfig corresponding to the cell with the smallest or largest serving cell index;
(b) CSI-ReportConfig corresponding to the cell with the smallest or largest subcarrier spacing;
(c) CSI-ReportConfig corresponding to the scheduling cell where the scheduling PDCCH is transmitted;
(d) CSI-ReportConfig corresponding to the PCell or PSCell; and
(e) CSI-ReportConfig corresponds to the cell that is the same as the one for PUSCH transmission carrying an A-CSI report.

In some embodiments, for multi-cell scheduling, a single CSI request field is included in the DCI to trigger CSI measurement configured for a reference cell. The reference cell can be determined in accordance with at least one or more following options:

(a) The cell with the smallest or largest serving cell index;
(b) The cell with the smallest or largest subcarrier spacing;
(c) The cell with the earliest scheduled PUSCH;
(d) The cell with the latest scheduled PUSCH;
(e) The scheduling cell where the scheduling PDCCH is transmitted;
(f) The cell that is configured by dedicated radio resource control (RRC) signaling. This can be configured per scheduling cell or can be configured as part of CSI-AperiodicTriggerStateList or CSI-ReportConfig.
(g) PCell or PSCell; and
(h) The cell that is the same as the one for PUSCH transmission carrying an A-CSI report.

In some aspects, more than one reference cell for CSI measurement may be determined in the case of multi-cell scheduling.

In some embodiments, the CSI reporting configuration, i.e., CSI-AperiodicTriggerStateList or CSI-ReportConfig can be separately configured for multi-cell scheduling from that for single-cell scheduling. In another option, it can reuse the configuration that is configured for single-cell scheduling.

In some embodiments, for multi-cell scheduling, N_Cell^group CSI request fields are included in the DCI, where each field is applied for a reference cell in a cell group and N_Cell^group is the number of cell groups for multi-cell scheduling. Further, the reference cell in a cell group can be determined in accordance with the aforementioned embodiments for the determination of the reference cell when a single CSI request field is included in the DCI.

Processing Timeline for A-CSI Report on PUSCH for Multi-Cell Scheduling

According to the CSI computation time in section 5.4 in TS 38.214, for an A-CSI report on a scheduled PUSCH, the gap between the end of the DCI and the start of the PUSCH should be no less than Z+X symbols, and the gap between the end of aperiodic CSI-RS or CSI-IM and the start of the PUSCH should be no less than Z' symbols. Herein, Z or Z' are determined by an SCS p corresponds to the min (μPDCCH, μCSI-RS, μUL) where the μPDCCH corresponds to the subcarrier spacing of the PDCCH with which the DCI was transmitted and μUL corresponds to the subcarrier spacing of the PUSCH with which the CSI report is to be transmitted and μCSI-RS corresponds to the minimum subcarrier spacing of the aperiodic CSI-RS triggered by the DCI. The value X is to account for the impact of UL TX switching.

In one embodiment of the invention, for multi-cell scheduling, the CSI computation time can be defined relative to the start of the earliest PUSCH of all scheduled or valid PUSCHs by the DCI. Specifically, for the UE to provide a valid CSI report, the gap between the end of the DCI and the start of the earliest PUSCH should be no less than Z symbols, and the gap between the end of aperiodic CSI-RS or CSI-IM and the start of the earliest PUSCH should be no less than Z' symbols.

Figure 8:
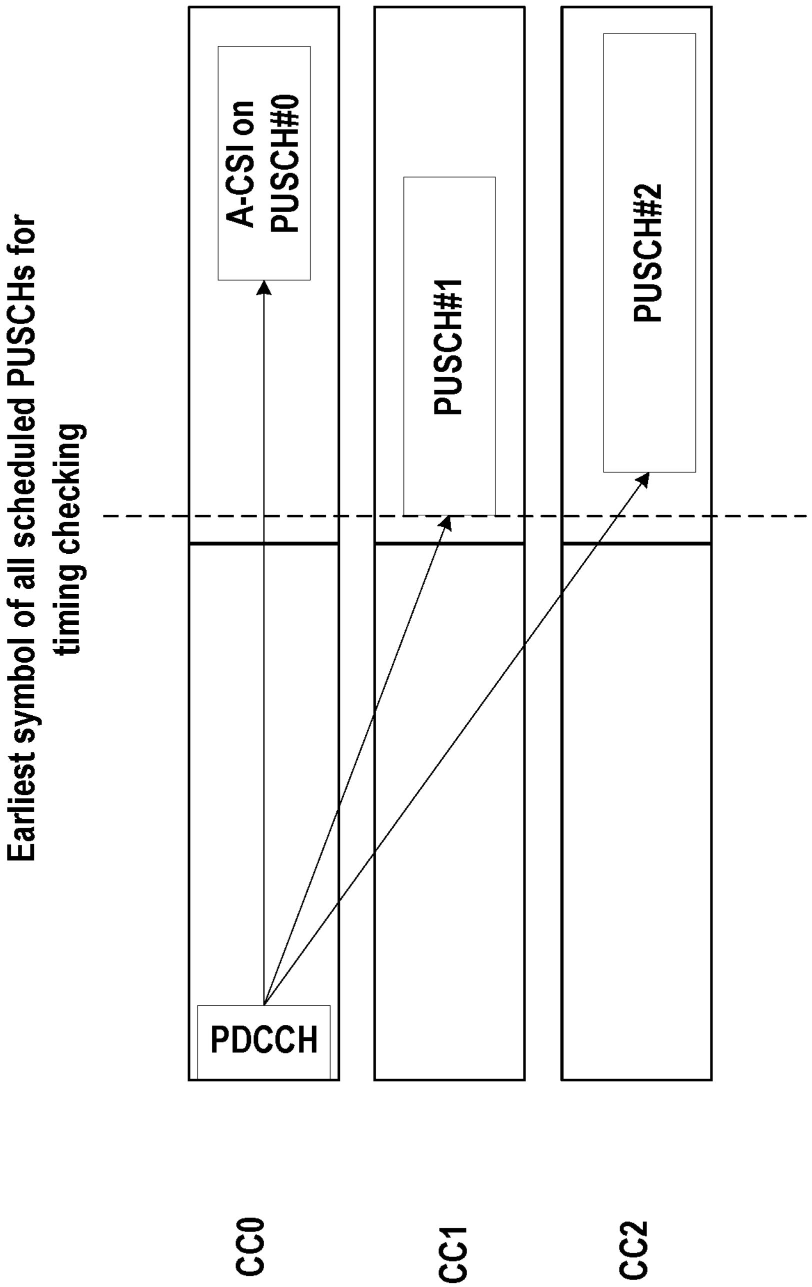
FIG. 8 is a diagram of CSI computation time checking by the earliest scheduled PUSCH, in accordance with some aspects.

FIG. 8 illustrates one example of the CSI computation time checking for multi-cell scheduling. In the example, the A-CSI report is multiplexed on the PUSCH #0 on the cell lowest cell index. However, due to the actual start timing of PUSCH #1 being the earliest among the 3 scheduled PUSCHs by the DCI, CSI computation time is checked relative to the start of PUSCH #1.

In some embodiments, for multi-cell scheduling, the CSI computation time can be defined relative to the start of the PUSCH carrying the A-CSI report. Specifically, for the UE to provide a valid CSI report, the gap between the end of the DCI and the start of the PUSCH carrying the A-CSI report should be no less than Z symbols, and the gap between the end of aperiodic CSI-RS or CSI-IM and the start of the PUSCH carrying the A-CSI report should be no less than Z' symbols.

Figure 9:
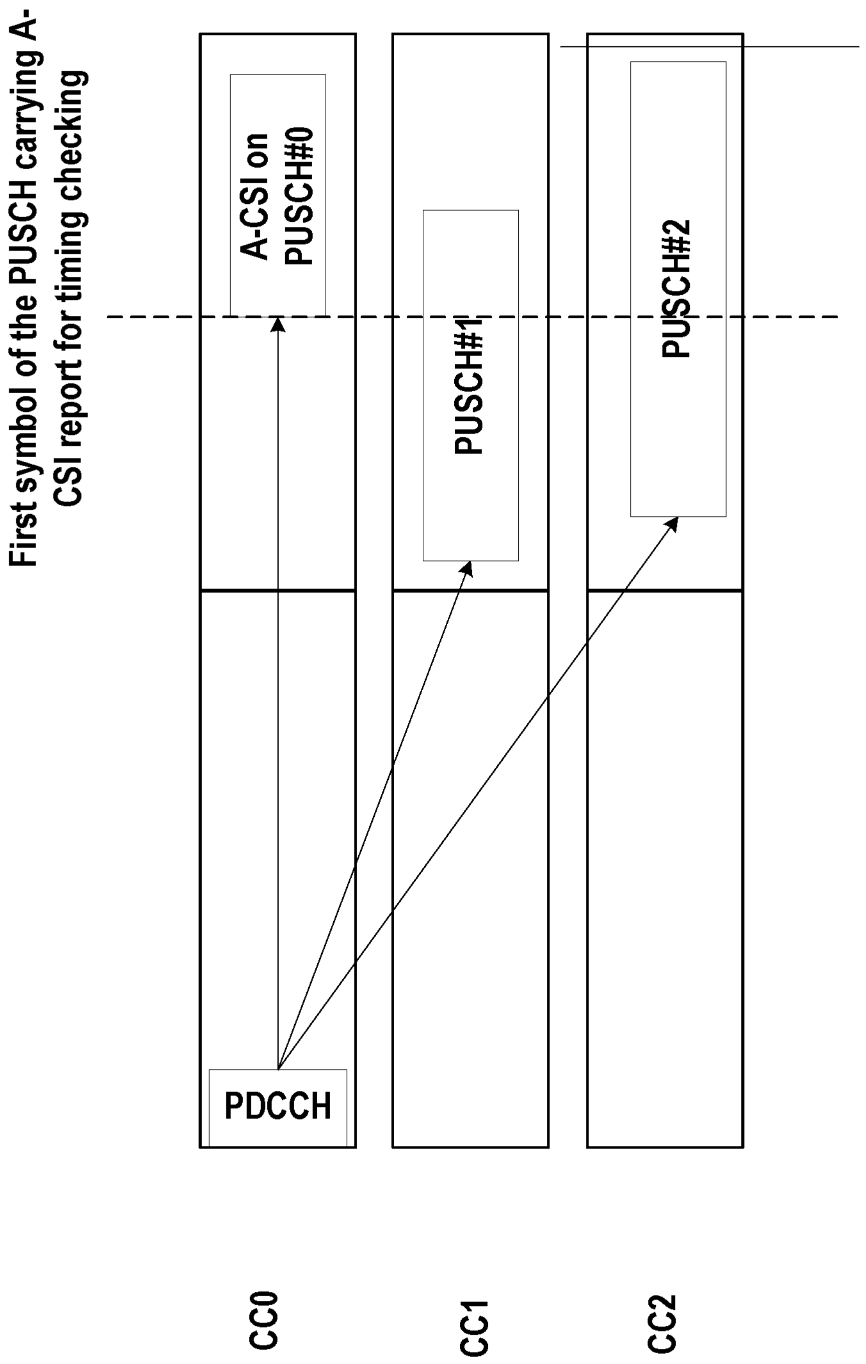
FIG. 9 is a diagram of CSI computation time checking by the PUSCH carrying the A-CSI report, in accordance with some aspects.

FIG. 9 illustrates another example of the CSI computation time checking for multi-cell scheduling. In the example, the A-CSI report is multiplexed on the PUSCH #0 on the cell lowest cell index. The CSI computation time is checked relative to the start of PUSCH #0. Since PUSCH #0 is not the earliest scheduled PUSCH, PUSCH #0 may meet the CSI computation time, however, another earlier PUSCH, e.g., PUSCH #1 may not satisfy the computation time of the reported A-CSI report.

UL-SCH Indicator, UL DAI, and Beta Offset Indicator for Multi-Cell Scheduling

Embodiments of UL-SCH indicator, UL DAI, and beta_offset indicator for multi-cell scheduling are provided as follows:

In some embodiments, for multi-cell scheduling, a single UL-SCH indicator is included in the DCI to indicate whether UL-SCH is transmitted on a PUSCH in all the scheduled cells or a cell group. Note that the PUSCH may be determined in accordance with the aforementioned embodiments for the reference determination for the PUSCH carrying an A-CSI report in a cell. In addition, in the UL-SCH indicator, a bit “1” indicates UL-SCH shall be transmitted on the reference PUSCH, and a bit “0” indicates UL-SCH shall not be transmitted on the reference PUSCH.

In some embodiments, for multi-cell scheduling, N_Cell^group UL-SCH indicator fields are included in the DCI, where each field is applied in a PUSCH in a cell group and N_Cell^group is the number of cell groups for multi-cell scheduling.

In some embodiments, for multi-cell scheduling, in the case when the number of scheduled cells for PUSCH transmissions is larger than one, the UL-SCH indicator is not included in the DCI for multi-cell PUSCH scheduling.

In some aspects, for multi-cell scheduling, a single or multiple DAI (downlink assignment index) is included in the DCI to indicate the HARQ-ACK codebook size when HARQ-ACK is multiplexed on a PUSCH in all the scheduled cells or a cell group.

In some aspects, for multi-cell scheduling, a single DAI field is included in the DCI, and the value of the DAI field is applicable for multiplexing HARQ-ACK information in the PUSCH transmission in any cell from the multiple cells where the UE multiplexes HARQ-ACK information.

In some embodiments, for multi-cell scheduling, N_Cell^group DAI fields are included in the DCI, where each field is applicable for multiplexing HARQ-ACK information in the PUSCH transmission in any cell from the multiple cells in a cell group where the UE multiplexes HARQ-ACK information and N_Cell^group is the number of cell groups for multi-cell scheduling.

In some aspects, for multi-cell scheduling, a single beta_offset field is included in the DCI to indicate the beta offset value when uplink control information (UCI) is multiplexed on a PUSCH in all the scheduled cells or a cell group.

In some aspects, the existing mechanism of UCI multiplexing on PUSCH as defined in NR can be reused. In the case of multi-cell PUSCH scheduling, when different UCI is multiplexed on more than one PUSCHs, the indicated beta offset value is applied for all the PUSCHs carrying the UCIs.

Further, in case semi-static beta offsets are configured in a cell, beta_offset field is not applicable for the UCI multiplexed on the cell.

Figure 10:
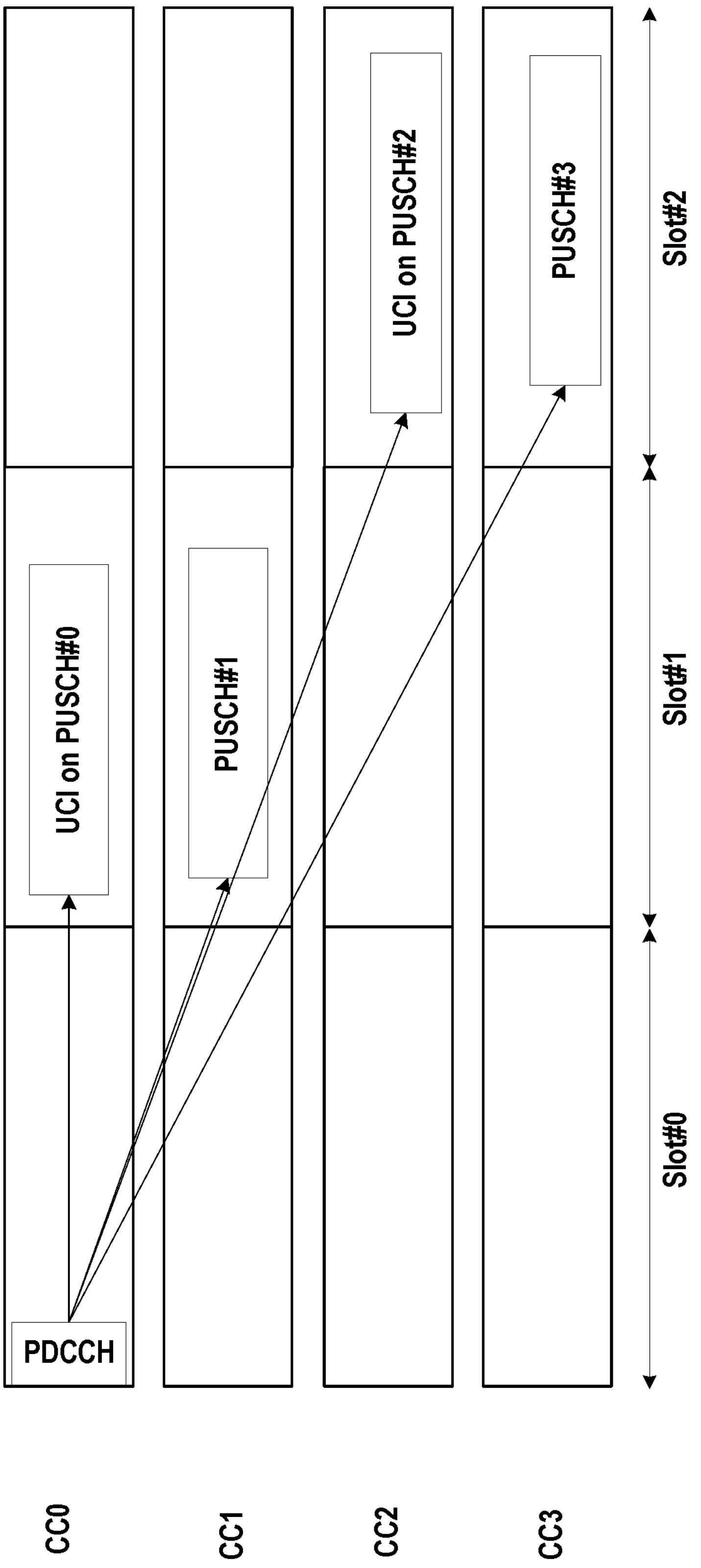
FIG. 10 is a diagram of beta offset indication for multi-cell PUSCH scheduling, in accordance with some aspects.

FIG. 10 illustrates one example of a beta offset indication for multi-cell PUSCH scheduling. In the example, a DCI with multi-cell scheduling is used to schedule 4 PUSCHs in 4 cells within a single-cell group. Further, PUCCHs are transmitted in both slot #1 and slot #2 and overlap with PUSCHs, respectively. Based on the existing mechanisms as defined in NR, UCIs are multiplexed on PUSCH #0 and #2, respectively. In this case, indicated beta offset is applied for the UCIs on PUSCH #0 and #2.

Sounding Reference Signal (SRS) Request for Multi-Cell Scheduling

Embodiments of Sounding reference signal (SRS) requests for multi-cell scheduling are provided as follows.

In some embodiments, for multi-cell scheduling, a single SRS request field is included in the DCI to trigger SRS transmission in a reference cell in all scheduled or configured cells for multi-cell scheduling or in a cell group. The reference cell can be determined in accordance with the aforementioned embodiments for the reference cell determination for the PUSCH carrying A-CSI report.

In another option, the reference cell for SRS transmission can be determined in accordance with the scheduling cell.

In some aspects, the configuration for SRS requests can be separately configured for multi-cell scheduling for a scheduling cell. In one example, for a scheduling cell, UE can be configured with supplementaryUplink in ServingCellConfig. In this case, the 3-bit SRS request field is used to trigger the SRS transmission in the reference cell. When the value of the first bit for the non-SUL/SUL indicator is indicated as SUL, SRS is transmitted in the SUL.

In some embodiments, the SRS request field is used to trigger SRS transmission in all the scheduled cells or the cells in a cell group. In this case, SRS transmission is triggered based on the configuration in each scheduled cell.

In some aspects, an SRS bitmap is used to indicate the SRS request for each scheduled cell or configured cells for multi-cell scheduling. The size of the bitmap may be determined in accordance with the number of scheduled cells or configured for multi-cell scheduling. In this case, each SRS field in the bitmap may be used to trigger the SRS transmission in the scheduled cells or configured cells, respectively.

In some aspects, a system and method of wireless communication for a fifth generation (5G) or new radio (NR) system is based on determining, by UE, a channel state information (CSI) request in a downlink control information (DCI) for scheduling physical uplink shared channel (PUSCH) with more than one cells; determining, by the UE, a reference PUSCH for carrying a CSI report; and transmitting, by the UE, the CSI report on the reference PUSCH.

In some aspects, the reference PUSCH in the cell is determined in accordance with the cell with the lowest serving cell index, largest serving cell index, second lowest serving cell index, or second largest serving cell index in a cell group or all scheduled cells that satisfy the multiplexing timeline.

In some aspects, the reference PUSCH in the cell is determined in accordance with the cell where the scheduling PDCCH is located, if applicable.

In some aspects, the reference PUSCH in the cell is determined in accordance with the PUSCH with the smallest SCS in a cell group or all scheduled cells that satisfy the multiplexing timeline. In case when multiple PUSCHs have the same SCS in different cells, the above options can be applied.

In some aspects, the reference PUSCH in the cell is determined in accordance with the PUSCH with the earliest starting time, last starting time, second earliest starting time, or second to last starting time in a cell group or all scheduled cells that satisfies the multiplexing timeline.

In some aspects, the reference PUSCH in the cell is determined in accordance with a cell in a cell group with the lowest cell group index or largest cell group index.

In some aspects, the reference PUSCH may be the configured PUSCH, scheduled PUSCH, or valid PUSCH in the case of multi-cell PUSCH scheduling.

In some aspects, a single CSI request field is included in the DCI to trigger CSI measurement configured in all scheduled or configured cells for multi-cell scheduling.

In some aspects, one single-bit parameter may be configured as part of CSI-ReportConfigs, CSI-AperiodicTriggerStateList, or CSI-ResourceConfig to indicate whether the CSI measurement for a cell is performed in case of multi-cell scheduling.

In some aspects, an additional index corresponding to a CSI-ReportConfig may be configured, wherein if multiple CSI-ReportConfigs with the same value of the index are requested, only one CSI-ReportConfig is considered for reporting by the UE.

In some aspects, for multi-cell scheduling, a single CSI request field is included in the DCI to trigger CSI measurement configured for a reference cell.

In some aspects, the CSI reporting configuration, i.e., CSI-AperiodicTriggerStateList or CSI-ReportConfig can be separately configured for multi-cell scheduling from that for single-cell scheduling.

In some aspects, for multi-cell scheduling, the CSI computation time can be defined relative to the start of the earliest PUSCH of all scheduled or valid PUSCHs by the DCI.

In some aspects, for multi-cell scheduling, the CSI computation time can be defined relative to the start of the PUSCH carrying the A-CSI report.

In some aspects, for multi-cell scheduling, a single UL-SCH indicator is included in the DCI to indicate whether UL-SCH is transmitted on a PUSCH in all the scheduled cells or a cell group.

In some aspects, for multi-cell scheduling, in the case when the number of scheduled cells for PUSCH transmissions is larger than one, the UL-SCH indicator is not included in the DCI for multi-cell PUSCH scheduling.

In some aspects, for multi-cell scheduling, a single or multiple DAI (downlink assignment index) is included in the DCI to indicate the HARQ-ACK codebook size when HARQ-ACK is multiplexed on a PUSCH in all the scheduled cells or a cell group.

In some aspects, for multi-cell scheduling, a single beta_offset field is included in the DCI to indicate the beta offset value when uplink control information (UCI) is multiplexed on a PUSCH in all the scheduled cells or a cell group.

In some aspects, for multi-cell scheduling, a single SRS request field is included in the DCI to trigger SRS transmission in a reference cell in all scheduled or configured cells for multi-cell scheduling or in a cell group.

In some aspects, an SRS bitmap is used to indicate the SRS request for each scheduled cell or configured cells for multi-cell scheduling.

Techniques for Cell Grouping for Multi-Cell Scheduling

NR supports a wide range of spectrums in different frequency ranges. It is expected that there will be increasing availability of spectrum in the market for 5G Advanced possibly due to re-farming from the bands originally used for previous cellular generation networks. Especially for frequency range (FR1) bands, the available spectrum blocks tend to be more fragmented and scattered with a narrower bandwidth. For FR2 bands and some FR1 bands, the available spectrum can be wider such that intra-band multi-carrier operation is necessary. To meet different spectrum needs, it is important to ensure that these scattered spectrum bands or wider bandwidth spectrum can be utilized in a more spectral/power efficient and flexible manner, thus providing higher throughput and decent coverage in the network.

One motivation is to increase flexibility and spectral/power efficiency in scheduling data over multiple cells including intra-band cells and inter-band cells. The current scheduling mechanism only allows the scheduling of a single cell physical uplink shared channel (PUSCH) or physical downlink shared channel (PDSCH) per a scheduling downlink control information (DCI). With more available scattered spectrum bands or wider bandwidth spectrum, the need for simultaneous scheduling of multiple cells is expected to be increasing. To reduce the control overhead, it is beneficial to extend from single-cell scheduling to multi-cell PUSCH/PDSCH scheduling with a single scheduling DCI. More specifically, a DCI is used to schedule PDSCH or PUSCH transmissions in more than one cell or component carrier (CC), where each PDSCH or PUSCH is scheduled in one cell or CC.

Figure 11:
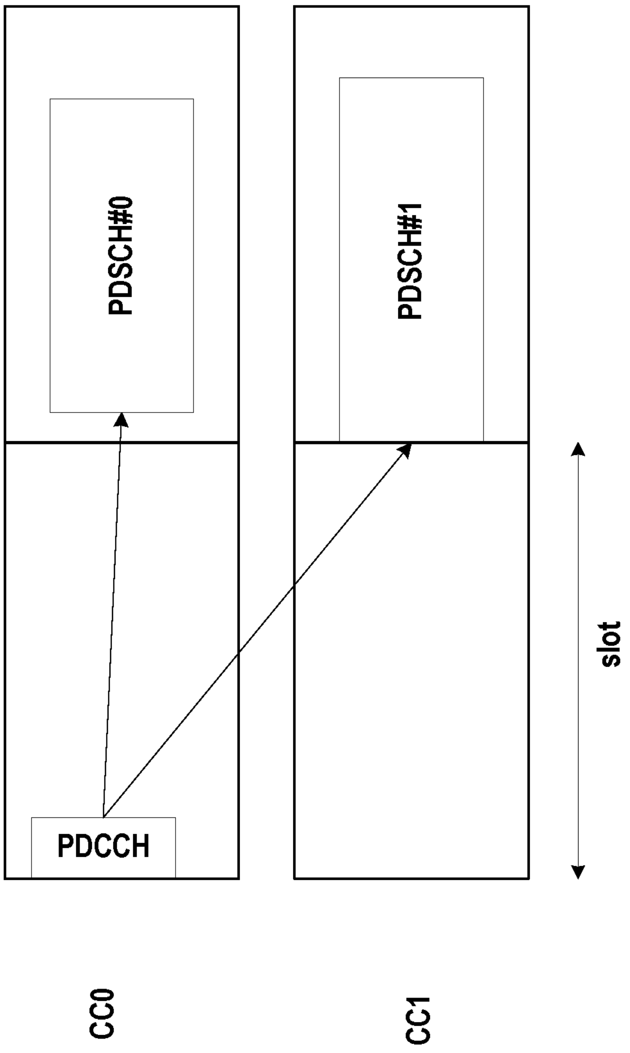
FIG. 11 is a diagram of multi-cell scheduling for PDSCH, in accordance with some aspects.

FIG. 11 illustrates one example of multi-cell scheduling for PDSCHs. In the example, one physical downlink control channel (PDCCH) is used to schedule two PDSCHs in two different cells, i.e., PDSCH #0 in CC0 and PDSCH #1 in CCL.

In some aspects, for multi-cell scheduling, when the number of cells scheduled for the transmission of PDSCHs or PUSCHs is large, e.g., >2, certain mechanisms may need to be defined to reduce the DCI payload size while maintaining certain scheduling flexibility.

The disclosed techniques include mechanisms on cell grouping multi-cell scheduling, such as cell grouping for multi-cell scheduling, DCI design for multi-cell scheduling, and DCI field size alignment.

Cell Grouping for Multi-Cell Scheduling

In NR, the current scheduling mechanism only allows the scheduling of a single cell physical uplink shared channel (PUSCH) or physical downlink shared channel (PDSCH) per a scheduling downlink control information (DCI). With more available scattered spectrum bands or wider bandwidth spectrum, the need for simultaneous scheduling of multiple cells is expected to be increasing. To reduce the control overhead, it is beneficial to extend from single-cell scheduling to multi-cell PUSCH/PDSCH scheduling with a single scheduling DCI. More specifically, a DCI is used to schedule PDSCH or PUSCH transmissions in more than one cell or component carrier (CC), where each PDSCH or PUSCH is scheduled in one cell or CC.

In some aspects, for multi-cell scheduling, when the number of cells scheduled for the transmission of PDSCHs or PUSCHs is large, e.g., >2, certain mechanisms may need to be defined to reduce the DCI payload size while maintaining certain scheduling flexibility.

Embodiments of cell grouping for multi-cell scheduling are provided as follows.

In some embodiments, for multi-cell scheduling where a DCI is used to schedule PDSCH or PUSCH transmissions in more than one cell or CC, the cells or CCs can be grouped into N cell groups, where N can be predefined in the specification or configured by higher layers via NR remaining minimum system information (RMSI), NR other system information (OSI) or dedicated radio resource control (RRC)

signaling, dynamically indicated in the DCI, or a combination thereof. In one example, N=1 or 2. In case N=1, all the cells are grouped into a single-cell group.

In some aspects, for cell grouping in the case of multi-cell scheduling, a first number of cells scheduled for PDSCH or PUSCH transmissions are grouped into a first cell group while a second number of cells scheduled for PDSCH or PUSCH transmissions are grouped into a second group.

Figure 12:
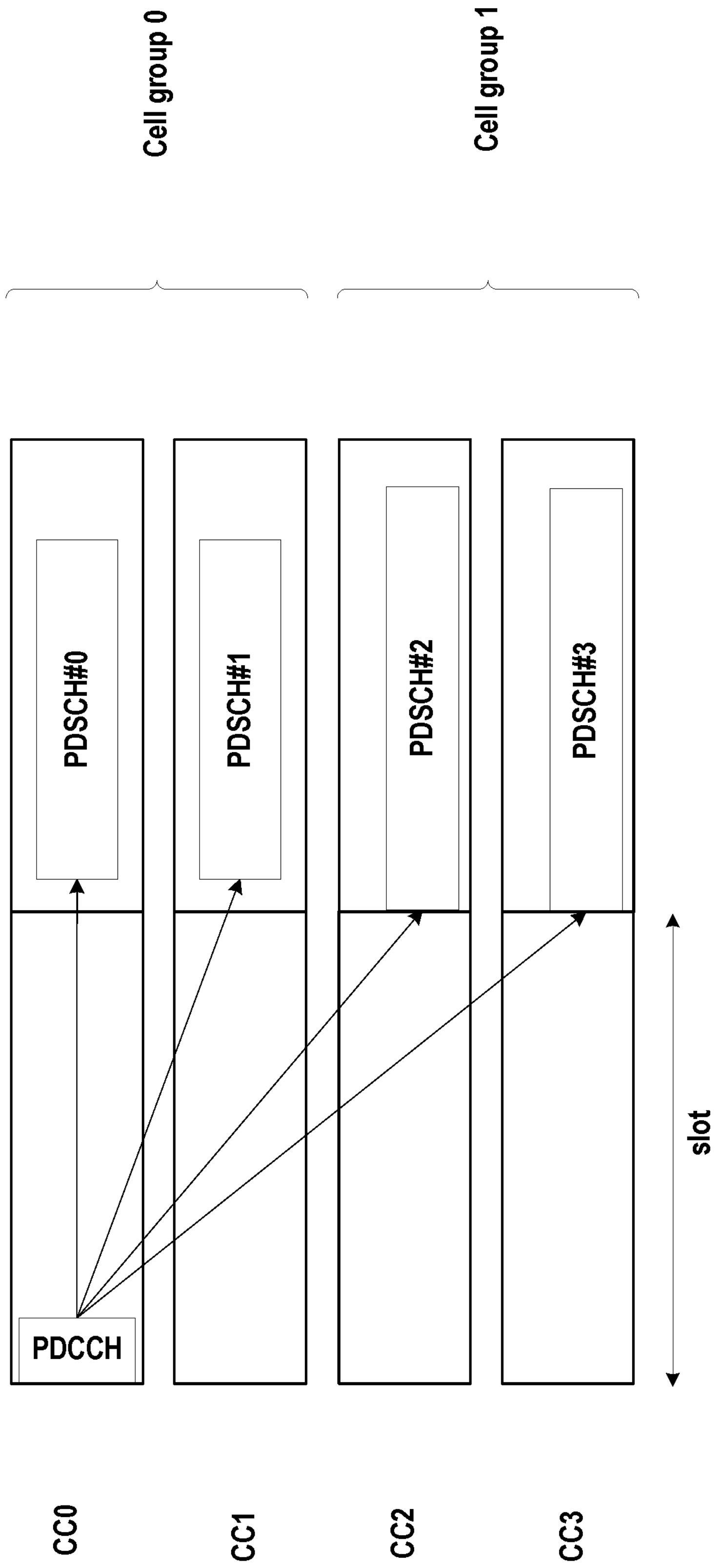
FIG. 12 is a diagram of cell grouping for multi-cell scheduling for PDSCH, in accordance with some aspects.

FIG. 12 illustrates one example of cell grouping for multi-cell scheduling for PDSCH. In the example, a PDCCH carrying DCI is used to schedule PDSCHs in 4 cells or CCs, where each PDSCH is allocated in one cell. Further, CC #0 and CC #1 are grouped into cell group #0 while CC #2 and CC #3 are grouped into cell group #1.

In some embodiments, for multi-cell scheduling, cell grouping can be configured by higher layers via RMSI, OSI, RRC signaling, dynamically indicated in the DCI, or a combination thereof.

In some aspects, a cell can be associated with a cell group for multi-cell scheduling. Note that the association can be configured by higher layers via RMSI, OSI, RRC signaling, dynamically indicated in the DCI, or a combination thereof.

In some embodiments, cells #0, #2, and #4 can be configured and associated with cell group #0. In addition, cells #1, #3, and #5 can be configured and associated with cell group #1. For multi-cell scheduling, when cells #0, 1, 3, and 4 are scheduled for PDSCH or PUSCH transmissions, PDSCH or PUSCHs in cells #0 and #4 are in the cell group #0 and PDSCH or PUSCHs in cell #1 and #3 are in the cell group #1.

In some embodiments, for multi-cell scheduling, cell grouping can be determined in accordance with the serving cell index. In one example, assuming M cells in multi-cell scheduling for PDSCH or PUSCH and the number of cell groups is 2, i.e., N=2, then the first [M/2] cells are grouped in the first cell group and the remaining [M/2] cells are in the second cell group. Note that the cell grouping may be defined based on the ascending order of the serving cell index.

In some embodiments, assuming M cells in multi-cell scheduling for PDSCH or PUSCH and the number of cell groups is 2, i.e., N=2, then the first [M/2] cells are grouped in the first cell group and the remaining [M/2] cells are in the second cell group. Assuming a DCI is used to schedule PDSCHs in 4 CCs for multi-cell scheduling as shown in FIG. 12, based on this option, CC #0 and CC #1 are grouped into cell group #0 while CC #2 and CC #3 are grouped into cell group #1.

In some embodiments, for multi-cell scheduling, cell grouping can be determined in accordance with the frequency range, i.e., whether the CCs or cells are in the frequency range 1 (FR1) and frequency range 2 (FR2), or whether the cells or CCs are in FR1, FR2-1 or FR2-2, or whether the cells or CCs are in the same band. In some aspects, FR1 indicates the carrier frequency below 7.125 GHz, FR2-1 indicates the carrier frequency between 24.25-52.6 GHz, and FR2-2 indicates the carrier frequency between 52.6 and 71 GHz.

In some embodiments, in the case when a DCI with multi-cell scheduling is used to schedule the PDSCHs or PUSCHs in both FR1 and FR2, the cells that are scheduled in the FR1 are in the first cell group, while the cells that are scheduled in the FR2 are in the second cell group.

Figure 13:
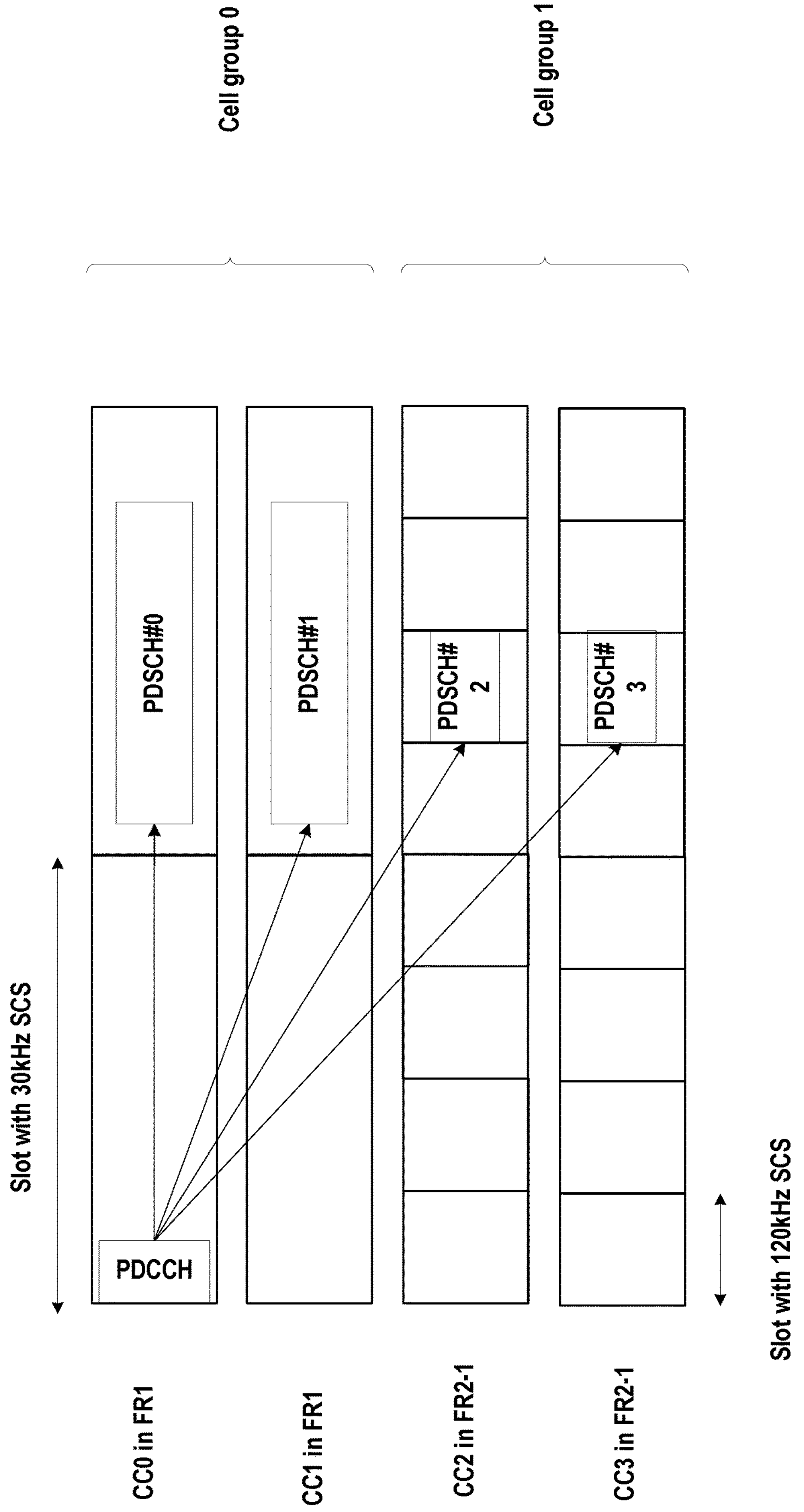
FIG. 13 is a diagram of cell grouping based on frequency range, in accordance with some aspects.

FIG. 13 illustrates one example of cell grouping based on the frequency range. In the example, for multi-cell scheduling, a DCI is used to schedule PDSCHs in 4 CCs. Further, CC #0 and CC #1 are in FR1 with 30 kHz subcarrier spacing (SCS), and CC #2 and CC #3 are in FR2-1 with 120 kHz SCS. Based on this option, CC #0 and CC #1 are grouped into cell group #0 while CC #2 and CC #3 are grouped into cell group #1.

In some embodiments, for multi-cell scheduling, cell grouping can be determined in accordance with the PUCCH group. In one example, in the case when a DCI with multi-cell scheduling is used to schedule the PDSCHs/PUSCHs in two PUCCH groups, the cells in the first PUCCH group are in the first cell group while the cells in the second PUCCH group are in the second cell group.

In some embodiments, for multi-cell scheduling, cell grouping can be determined in accordance with the subcarrier spacing (SCS) associated with the scheduled PDSCH or PUSCH in a cell. In one example, when the SCS difference between the scheduled PDSCHs or PUSCHs in different cells is less than or equal to a predefined or configured value, the cells with the scheduled PDSCHs or PUSCHs are in the same cell group.

In some embodiments, for multi-cell scheduling, the cell grouping can be dependent on the active BWPs of the scheduled cells. For example, one cell group includes all the scheduled cells with a size of active BWP higher than a predefined or configured value. On the other hand, the other cell group includes all other scheduled cells.

In some embodiments, for multi-cell scheduling, the cell grouping is common for a DCI for PDSCH scheduling and a DCI for PUSCH scheduling. Alternatively, for multi-cell scheduling, the cell grouping is determined separately for a DCI for PDSCH scheduling and a DCI for PUSCH scheduling.

In some embodiments, for multi-cell scheduling, the different cell grouping may be applied to different DCI fields. For example, for the TDRA field, the cells with active BWPs using different SCS may belong to different cell groups. On the other hand, for the FDRA field, the cells with active BWPs of different BWP sizes can belong to different groups.

In some embodiments, for multi-cell scheduling, a UE can be scheduled for only one cell group by a single DCI. In one example, N=1. In another example, gNB configures N>1, while only one cell group can be scheduled by one DCI. In some aspects, for multi-cell scheduling, a UE can be configured with an N1 cell group, while the UE can be scheduled for only N (N N1) cell group by a single DCI. For example, if a UE is configured with CCs in FR1, FR2-1, and FR 2-2, which belongs to 3 cell groups, but gNB can only schedule up to 2 cell groups by a DCI.

DCI Design for Multi-Cell Scheduling

Embodiments of DCI design for multi-cell scheduling are provided as follows.

In some embodiments, for multi-cell PDSCH scheduling, one or more following fields, if applicable, may appear only once in the DCI: an identifier for DCI formats, VRB-to-PRB mapping, PRB bundling size indicator, rate matching indicator, zero power channel state information reference signal (ZP CSI-RS) trigger, HARQ process number, TPC command for scheduled PUCCH, PUCCH resource indicator, PDSCH-to-HARQ_feedback timing indicator, one-shot HARQ-ACK request, PDSCH group index, new feedback indicator, number of requested PDSCH group(s), SRS request, DMRS sequence initialization, a priority indicator, minimum applicable scheduling offset indicator and SCell dormancy indication.

This option indicates that the listed field may be commonly applied for all the scheduled or valid PDSCHs for multi-cell PDSCH scheduling. Valid PDSCH indicates that PDSCH is transmitted, or not overlapping with a UL symbol indicated by tdd-UL-DL-ConfigurationCommon or tdd-UL-DL-ConfigurationDedicated if provided in each cell.

In some embodiments, for multi-cell PDSCH scheduling, one or more of the aforementioned fields, if applicable, may appear N times in the DCI, where every single field appears only once for each cell group, and the single field is commonly applied for the scheduled or valid PDSCHs in a cell group. Note that N is the number of cell groups for multi-cell scheduling.

In some embodiments, for multi-cell PDSCH scheduling, one or more of the aforementioned fields, if applicable, may appear M times in the DCI, where every single field is applied for the scheduled or valid PDSCHs in a cell, where M is the number of scheduled cells for multi-cell scheduling.

In some embodiments, for multi-cell PUSCH scheduling, one or more following fields, if applicable, may appear only once in the DCI: identifier for DCI formats, DFI flag, UL/SUL indicator, frequency hopping flag, TPC command for scheduled PUSCH, SRS resource indicator, precoding information and a number of layers, antenna ports, SRS request, CSI request, PTRS-DMRS association, beta_offset indicator, DMRS sequence initialization, UL-SCH indicator, ChannelAccess-CPext-CAPC, open-loop power control parameter set indication, a priority indicator, invalid symbol pattern indicator, minimum applicable scheduling offset indicator, SCell dormancy indication, and sidelink assignment index.

This indicates that the listed field may be commonly applied for all the scheduled or valid PUSCHs for multi-cell PUSCH scheduling. Note that valid PUSCH indicates that PUSCH is transmitted, or not overlapping with a DL symbol indicated by tdd-UL-DL-ConfigurationCommon or tdd-UL-DL-ConfigurationDedicated if provided, or a symbol of an SS/PBCH block with an index provided by ssb-PositionsInBurst.

In some embodiments, for multi-cell PUSCH scheduling, one or more aforementioned fields, if applicable, may appear N times in the DCI, where every single field appears only once for each cell group, and the single field is commonly applied for the scheduled or valid PUSCHs in a cell group. N is the number of cell groups for multi-cell scheduling.

In some embodiments, for multi-cell PUSCH scheduling, one or more of the aforementioned fields, if applicable, may appear M times in the DCI, where every single field is applied for the scheduled or valid PUSCHs in a cell, where M is the number of scheduled cells for multi-cell scheduling.

DCI Field Size Alignment

For multi-cell scheduling, when a single field in the DCI is commonly applied for all the scheduled cells or the cells in a cell group, and when the configuration for PDSCH or PUSCH transmission may be different in different cells, the bit-width of the field may not be aligned between different cells. In this case, a certain mechanism may need to be defined to align the DCI field size among cells for multi-cell scheduling.

Embodiments of DCI field size alignment are provided as follows.

In some embodiments, for multi-cell scheduling, when a DCI field is commonly applied for more than one cell for all the scheduled cells or the cells in a cell group, the bit-width of the common field is determined as maximum bit-widths from all the scheduled cells or the cells in a cell group based on the configuration for the corresponding cells. For a given cell, if the field size is less than the determined common field size, then a number of the most significant bits are ignored to derive the corresponding values.

This indicates that the modulo operation is applied for the smaller number of bits for the field in the given cell. Assuming that the indicated value for the determined common field is X and the bit-width of the field in a cell is B, and B≤X, then the value applied for the cell is mod(X, $2^B$).

In some embodiments, assuming 2 cells are scheduled by a multi-cell scheduling DCI, a first cell is configured with both rateMatchPatternGroup1 and rateMatchPatternGroup2, then the determined Rate matching indicator is 2 bits. Further, a second cell is configured with only rateMatchPatternGroup1, then the determined Rate matching indicator is 1 bit. Based on this option, 2 bits are determined for the common field Rate matching indicator. Assuming the indicated value for the common field Rate matching indicator is X, then the value applied for the second cell is mod (X, 2).

In some embodiments, for multi-cell scheduling, UE is expected same configuration for the transmissions of PDSCH and PUSCH in different cells in the same cell group or all the scheduled cells. This indicates that the same DCI field size is assumed for the cells in a cell group or all the scheduled cells in the case of multi-cell scheduling.

In some embodiments, for multi-cell scheduling, when a DCI field is commonly applied for more than one cell for all the scheduled cells or the cells in a cell group, the bit-width of the common field is determined as the minimum bit-width from the scheduled cells or the cells in a cell group based on the configuration for the corresponding cells. For a given cell, if the field size is greater than the determined common field size, zero padding is applied, i.e., a number of most significant bits with a value set to '0' on the determined common field to derive the value for the cell. In this case, this indicates that the indicated value is applied for the cell.

In some embodiments, assuming 2 cells are scheduled by a multi-cell scheduling DCI, a first cell is configured with both rateMatchPatternGroup1 and rateMatchPatternGroup2, then the determined Rate matching indicator is 2 bits. Further, a second cell is configured with only rateMatchPatternGroup1, then the determined Rate matching indicator is 1 bit. Based on this option, 1 bit is determined for the common field Rate matching indicator. Assuming the indicated value for the common field Rate matching indicator is X, then the value applied for the first cell is X.

In some embodiments, for multi-cell scheduling, when a DCI field is commonly applied for more than one cell for all the scheduled cells or the cells in a cell group, the bit-width of the common field is determined in accordance with the bit-width of a reference cell from the scheduled cells or the cells in a cell group based on the configuration for the reference cell.

Further, for a given cell, if the field size is less than the determined common field size, then a number of the most significant bits are ignored to derive the corresponding values. If the field size is greater than the determined common field size, zero padding is applied, i.e., a number of most significant bits with the value set to '0' on the determined common field to derive the value for the cell. In this case, this indicates that the indicated value is applied for the cell.

The reference cell may be determined based on one of the following rules or a combination thereof:

(a) A cell with the lowest or largest serving cell index;
(b) A cell with the second lowest or second largest serving cell index;
(c) A cell with earlier or latest starting symbol position for scheduled PDSCH or PUSCH;
(d) A cell with the smallest subcarrier spacing (SCS);
(e) A cell for the scheduling PDCCH; and (f) A PCell or PSCell.

In some embodiments, for multi-cell scheduling, when a DCI field is commonly applied for more than one cell for all the scheduled cells or the cells in a cell group, if the bit-width of the common field is determined as the maximum or minimum bit-width from the scheduled cells or the cells in a cell group according to the bit-width of a reference cell based on the configuration for the corresponding cell(s), the bit-width from each cell or the reference cell is based on the configuration for a reference DCI format for the cell.

In some embodiments, the reference DCI format is the same DCI format for multi-cell scheduling. Assuming a single DCI format, e.g., DCI format 1-1 is defined for both single and multi-cell scheduling. Then, the bit width for each cell is determined by the configuration for the bit field in DCI format 1-1 for single-cell scheduling.

In some embodiments, the reference DCI format is the DCI format other than fallback DCI for single-cell scheduling. For example, assuming a serving cell is configured with a search space (SS) set with DCI format 1-0 (fallback DCI), an SS set with DCI format 1-2 for single cell scheduling, and a SS set with DCI format 1-3 for multi-cell scheduling. The reference DCI format for the serving cell is DCI format 1-2.

In some embodiments, the reference DCI format is predefined, e.g., DCI format 1-1, or configured by gNB. In one option, gNB may configure RRC parameters for a bit field for a reference DCI format, while gNB does not configure a SS set with the reference DCI format. In another option, UE is expected to be configured with a SS set with the reference DCI format.

In some embodiments, for multi-cell scheduling, when a DCI field is commonly applied for more than one cell for all the scheduled cells or the cells in a cell group, UE is expected to be configured with the same configuration among the scheduled cells or the cells in a cell group. In this case, the bit-width from all the scheduled cells or the cells in a cell group is the same.

In some embodiments, for multi-cell scheduling, if the determined bit-width for a field is 0 bit based on the configuration for a given cell, the common field is not applied for the cell.

In one example, for multi-cell PDSCH scheduling, if the higher layer parameter prb-BundlingType is not configured or is set to 'staticBundling', the bit-width for PRB bundling size indicator is 0 bit for a given cell. If the determined common field size is 1 bit, then the common field in the DCI for multi-cell scheduling is not applied for the cell.

In some embodiments, for multi-cell scheduling, when a DCI field is commonly applied for more than one cell for all the scheduled cells or the cells in a cell group, the bit-width of the common field is determined in accordance with the bit-width of RRC parameters. For example, gNB configures a separate Rate matching pattern for single-cell and multi-cell scheduling, and the bit-width of the rate-matching indicator is determined by the rate-matching pattern for multi-cell scheduling.

In some embodiments, for multi-cell scheduling, modulation and coding scheme (MCS) is commonly applied for all the scheduled cells or the cells in a cell group. In the former case, one MCS field can be included in the DCI, while in the latter case, $$N_{Cell}^{group}$$

MCS fields can be included in the DCI, where $$N_{Cell}^{group}$$

is the number of cell groups for multi-cell scheduling. Note that when $$N_{Cell}^{group} = 1,$$

this indicates that all the cells are in a cell group.

In case when 2 transport blocks (TB) are configured or enabled for the scheduled PDSCHs, 2 or $$2N_{Cell}^{group}$$

MCS fields can be included in the DCI, which can be applied for the first and second TB for all the scheduled cells or the cells in a cell group, respectively. Note that the configuration of 2 TBs may be configured for multi-cell scheduling in the scheduling cell. In this case, 2 TBs may be applied for all the scheduled PDSCHs in the scheduled cells or the cells for a cell group.

In case when different numbers of TBs are configured for different cells 2 MCS fields can be included in the DCI where the first MCS is applied for the 1st TB of the scheduled PDSCH, and the second MCS is applied for the 2nd TB of the scheduled PDSCH in a cell if 2 TBs are configured or enabled for the cell.

Yet in another option, in the case when different numbers of TBs are configured for different cell groups, 2 MCS fields can be included in the DCI for the cell group configured with 2 TBs while 1 MCS field can be included in the DCI for the cell group configured with 1 TB. For the case of 2 MCS fields, the first MCS is applied for the 1st TB of the scheduled PDSCH in the cell group while the second MCS is applied for the 2nd TB of the scheduled PDSCH in the cell group.

In one example, assuming 2 cell groups for multi-cell scheduling, and the first and second cell groups are configured with 2 TBs and 1 TB, respectively, then the 3 MCS fields are included in the DCI, where the first two MCS fields are applied for the first cell group and third MCS field is applied for the second cell group.

In some embodiments, for multi-cell scheduling, a new data indicator (NDI) and redundancy version (RV) bitmap is included in the DCI, where each bit in the bitmap is used to indicate the NDI and RV for each scheduled PDSCH or PUSCH, respectively. Further, the size of the NDI and RV bitmap can be respectively determined as $N_{Cell}$, where $N_{Cell}$ is the number of configured cells or the maximum number of scheduled cells which is determined in accordance with the carrier index table and/or TDRA table for multi-cell scheduling in the scheduling cell. In case when 2 TBs are configured or enabled for the scheduled PDSCHs, the size of the bitmap may be determined as $2N_{Cell}$.

Further, when a single PDSCH or PUSCH is scheduled for multi-cell scheduling, RV for the scheduled PDSCH or PUSCH can be 2 bits for the 1st TB. In case when 2 TBs are configured or enabled for the single PDSCH, the RV for the scheduled PDSCH can be 4 bits.

In some embodiments, for multi-cell scheduling, when 1 TB is configured for PDSCH and PUSCH transmission, a HARQ process number may be commonly applied for all the scheduled cells or the cells in a cell group. In the latter case, $$N_{Cell}^{group}$$

HARQ process number field may be included in the DCI.

When 2 TBs are configured or enabled for the scheduled PDSCHs, 2 or $$2N_{Cell}^{group}$$

HARQ process number fields can be included in the DCI, which can be applied for the first and second TB for all the scheduled cells or the cells in a cell group, respectively.

If all the scheduled PDSCH/PUSCH transmissions are for the initial transmission, UE may ignore the HARQ process number field for the retransmission.

In some embodiments, for multi-cell scheduling, when 1 TB is configured for PDSCH and PUSCH transmission, a HARQ process number may be commonly applied for all the scheduled cells or the cells in a cell group for the PDSCH or PUSCH initial transmission. Further, an additional HARQ process number may be commonly applied for the PDSCH or PUSCH retransmission for the PDSCHs or PUSCHs for all the scheduled cells or the cells in a cell group.

When 2 TBs are configured or enabled for the scheduled PDSCHs, 4 and $$4N_{Cell}^{group}$$

HARQ process number field may be included in the DCI, which can be applied for the first and second TB, initial and retransmission of the scheduled PDSCHs for all the scheduled cells or the cells in a cell group, respectively.

In some embodiments, for multi-cell scheduling, when 1 TB is configured for PDSCH and PUSCH transmission, a HARQ process number may be applied for reference PDSCH or PUSCH for all the scheduled cells or the cells in a cell group.

The reference PDSCH/PUSCH may be the scheduled PDSCH/PUSCH or the valid PDSCH/PUSCH with a small cell index. Note that valid PDSCH indicates that PDSCH is transmitted, or not overlapping with a UL symbol indicated by tdd-UL-DL-ConfigurationCommon or tdd-UL-DL-ConfigurationDedicated if provided in each cell. In addition, valid PUSCH indicates that PUSCH is transmitted, or not overlapping with a DL symbol indicated by tdd-UL-DL-ConfigurationCommon or tdd-UL-DL-ConfigurationDedicated if provided, or a symbol of an SS/PBCH block with an index provided by ssb-PositionsInBurst.

For the HARQ process number of other scheduled or valid PDSCHs or PUSCHs, it is incremented by 1 based on the increasing order of cell indexes and the indicated HARQ process number in the DCI. If it is greater than the configured maximum number of HARQ processes, a modulo operation is applied to determine the HARQ process number.

When 2 TBs are configured or enabled for the scheduled PDSCHs, 2 or $$2N_{Cell}^{group}$$

HARQ process number fields can be included in the DCI, which can be applied for the first and second TB for all the scheduled cells or the cells in a cell group, respectively. The same rule for 1st TB for the determination of HARQ process number can be applied to that of 2nd TB.

In some embodiments, if 2 TB transmission is configured and enabled and more than one PDSCH is scheduled by a multi-cell scheduling DCI, either the first or the second transport block of all scheduled PDSCHs is disabled by the DCI if IMCS=26 and if RV bits are set to '1' for the corresponding TB of all scheduled PDSCHs for all the scheduled cells or the cells in a cell group.

A system and method of wireless communication for a fifth generation (5G) or new radio (NR) system can be configured based on detecting, by a UE, a downlink control information (DCI) that is used to schedule physical uplink shared channel (PUSCH) or physical downlink shared channel (PDSCH) in more than one cell; and determining, by the UE, a number of cells for a cell group and a number of cell groups in accordance with the detected DCI and higher layer configurations.

In some aspects, the number of cell groups can be predefined in the specification or configured by higher layers via NR remaining minimum system information (RMSI), NR other system information (OSI), or dedicated radio resource control (RRC) signaling, dynamically indicated in the DCI, or a combination thereof.

In some aspects, the first number of cells scheduled for PDSCH or PUSCH transmissions are grouped into a first cell group while a second number of cells scheduled for PDSCH or PUSCH transmissions are grouped into a second group.

In some aspects, a cell can be associated with a cell group for multi-cell scheduling.

In some aspects, cell grouping can be determined in accordance with the serving cell index.

In some aspects, cell grouping can be determined in accordance with the frequency range, i.e., whether the CCs or cells are in the frequency range 1 (FR1) and frequency range 2 (FR2), or whether the cells or CCs are in FR1, FR2-1 or FR2-2, or whether the cells or CCs are in the same band.

In some aspects, cell grouping can be determined in accordance with the PUCCH group.

In some aspects, cell grouping can be determined in accordance with the subcarrier spacing (SCS) associated with the scheduled PDSCH or PUSCH in a cell.

In some aspects, cell grouping can be dependent on the active BWPs of the scheduled cells.

In some aspects, cell grouping is common for a DCI for PDSCH scheduling and a DCI for PUSCH scheduling.

In some aspects, one or more fields, if applicable, may appear only once in the DCI, which may be commonly applied for all the scheduled or valid PDSCHs for multi-cell PDSCH scheduling.

In some aspects, one or more fields, if applicable, may appear only once in the DCI, which may be commonly applied for all the scheduled or valid PUSCHs for multi-cell PUSCH scheduling.

In some aspects, one or more of the aforementioned fields, if applicable, may appear N times in the DCI, where every single field appears only once for each cell group, and the single field is commonly applied for the scheduled or valid PDSCHs or PUSCHs in a cell group.

In some aspects, one or more of the aforementioned fields, if applicable, may appear M times in the DCI, where every single field is applied for the scheduled or valid PDSCHs or PUSCHs in a cell, where M is the number of scheduled cells for multi-cell scheduling.

In some aspects, when a DCI field is commonly applied for more than one cell for all the scheduled cells or the cells in a cell group, the bit-width of the common field is determined as the maximum bit-widths from all the scheduled cells or the cells in a cell group based on the configuration for the corresponding cells.

In some aspects, the UE is expected same configuration for the transmissions of PDSCH and PUSCH in different cells in the same cell group or all the scheduled cells.

In some aspects, when a DCI field is commonly applied for more than one cell for all the scheduled cells or the cells in a cell group, the bit-width of the common field is determined as the minimum bit-width from the scheduled cells or the cells in a cell group based on the configuration for the corresponding cells.

In some aspects, when a DCI field is commonly applied for more than one cell for all the scheduled cells or the cells in a cell group, the bit-width of the common field is determined in accordance with the bit-width of a reference cell from the scheduled cells or the cells in a cell group based on the configuration for the reference cell.

In some aspects, when a DCI field is commonly applied for more than one cell for all the scheduled cells or the cells in a cell group, if the bit-width of the common field is determined as the maximum or minimum bit-width from the scheduled cells or the cells in a cell group according to the bit-width of a reference cell based on the configuration for the corresponding cell(s), the bit-width from each cell or the reference cell is based on the configuration for a reference DCI format for the cell.

In some aspects, wherein when a DCI field is commonly applied for more than one cell for all the scheduled cells or the cells in a cell group, UE is expected to be configured with the same configuration among the scheduled cells or the cells in a cell group.

In some aspects, when a DCI field is commonly applied for more than one cell for all the scheduled cells or the cells in a cell group, the bit-width of the common field is determined in accordance with the bit-width of RRC parameters for multi-cell scheduling.

In some aspects, for multi-cell scheduling, modulation and coding scheme (MCS) is commonly applied for all the scheduled cells or the cells in a cell group.

In some aspects, when 2 transport blocks (TB) are configured or enabled for the scheduled PDSCHs, 2 or $$2N_{Cell}^{group}$$

MCS fields can be included in the DCI, which can be applied for the first and second TB for all the scheduled cells or the cells in a cell group, respectively.

In some aspects, for multi-cell scheduling, a new data indicator (NDI) and redundancy version (RV) bitmap is included in the DCI, where each bit in the bitmap is used to indicate the NDI and RV for each scheduled PDSCH or PUSCH, respectively.

In some aspects, for multi-cell scheduling, when 1 TB is configured for PDSCH and PUSCH transmission, a HARQ process number may be commonly applied for all the scheduled cells or the cells in a cell group.

In some aspects, for multi-cell scheduling, when 1 TB is configured for PDSCH and PUSCH transmission, a HARQ process number may be commonly applied for all the scheduled cells or the cells in a cell group for the PDSCH or PUSCH initial transmission; wherein additional HARQ process number may be commonly applied for the PDSCH or PUSCH retransmission for the PDSCHs or PUSCHs for all the scheduled cells or the cells in a cell group In some aspects, for multi-cell scheduling, when 1 TB is configured for PDSCH and PUSCH transmission, a HARQ process number may be applied for reference PDSCH or PUSCH for all the scheduled cells or the cells in a cell group.

Figure 14:
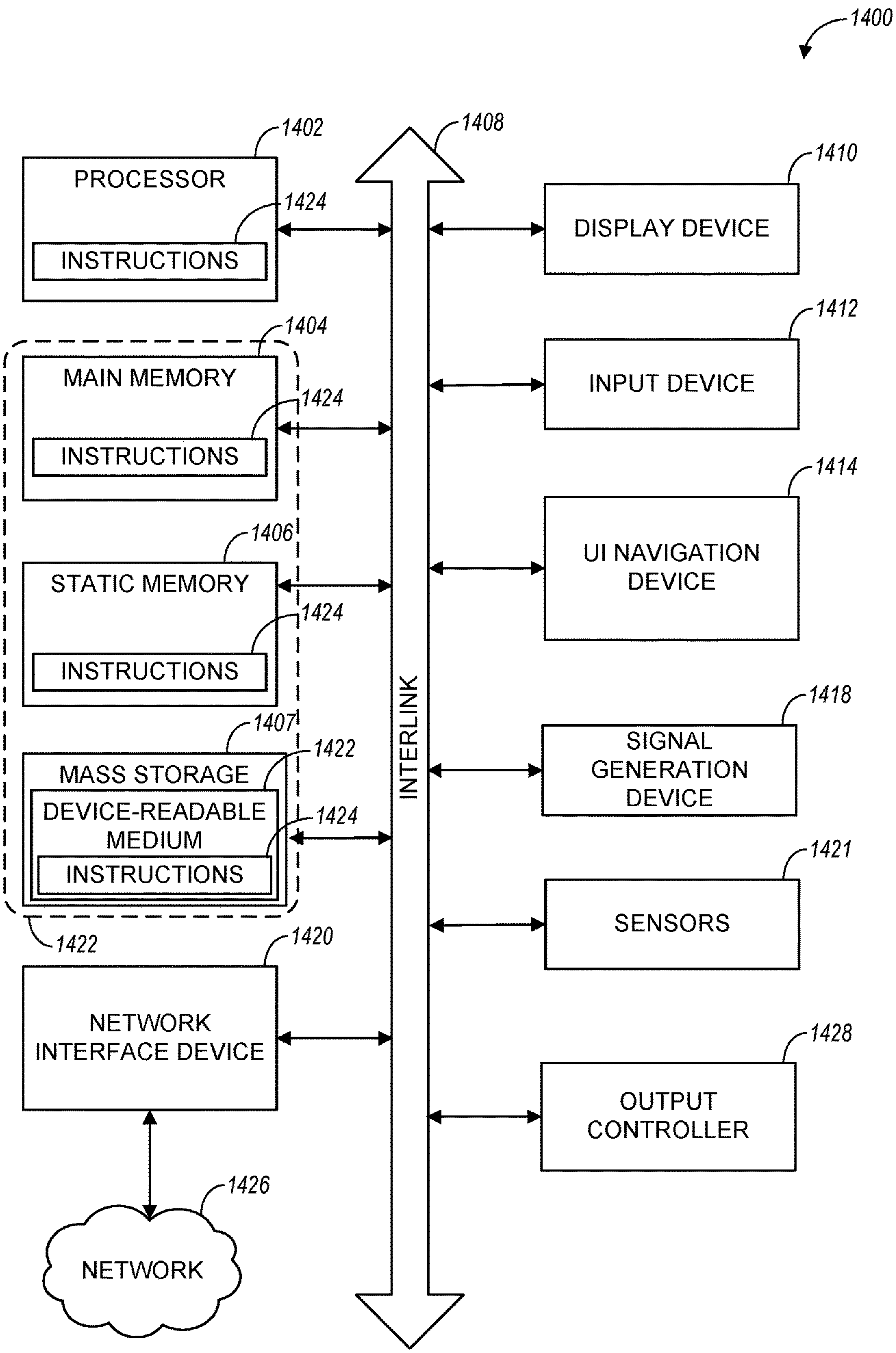
FIG. 14 illustrates a block diagram of a communication device such as an evolved Node-B (eNB), a new generation Node-B (gNB) (or another RAN node), an access point (AP), a wireless station (STA), a mobile station (MS), or user equipment (UE), in accordance with some aspects.

In some aspects, if 2 TB transmission is configured and enabled and more than one PDSCH is scheduled by a multi-cell scheduling DCI, either the first or the second transport block of all scheduled PDSCHs is disabled by the DCI if IMCS=26 and if RV bits are set to '1' for the corresponding TB of all scheduled PDSCHs for all the scheduled cells or the cells in a cell group FIG. 14 illustrates a block diagram of a communication device such as an evolved Node-B (eNB), a new generation Node-B (gNB) (or another RAN node), an access point (AP), a wireless station (STA), a mobile station (MS), or user equipment (UE), in accordance with some aspects and to perform one or more of the techniques disclosed herein. In alternative aspects, the communication device 1400 may operate as a standalone device or may be connected (e.g., networked) to other communication devices.

Circuitry (e.g., processing circuitry) is a collection of circuits implemented in tangible entities of the device 1400 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in the first circuit of a first circuitry at one point in time and reused by a second circuit in the first circuitry, or by a third circuit in a second circuitry at a different time. Additional examples of these components with respect to the device 1400 follow.

In some aspects, the device 1400 may operate as a standalone device or may be connected (e.g., networked) to other devices. In a networked deployment, the communication device 1400 may operate in the capacity of a server communication device, a client communication device, or both in server-client network environments. In an example, the communication device 1400 may act as a peer communication device in a peer-to-peer (P2P) (or other distributed) network environment. The communication device 1400 may be a UE, eNB, PC, a tablet PC, STB, PDA, mobile telephone, smartphone, a web appliance, network router, a switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or several components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 1400 may include a hardware processor 1402 (e.g., a central processing unit (CPU), a graphics processing unit (GPU), a hardware processor core, or any combination thereof), a main memory 1404, a static memory 1406, and a storage device 1407 (e.g., hard drive, tape drive, flash storage, or other block or storage devices), some or all of which may communicate with each other via an interlink (e.g., bus) 1408.

The communication device 1400 may further include a display device 1410, an alphanumeric input device 1412 (e.g., a keyboard), and a user interface (UI) navigation device 1414 (e.g., a mouse). In an example, the display device 1410, input device 1412, and UI navigation device 1414 may be a touchscreen display. The communication device 1400 may additionally include a signal generation device 1418 (e.g., a speaker), a network interface device 1420, and one or more sensors 1421, such as a global positioning system (GPS) sensor, compass, accelerometer, or another sensor. The communication device 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1407 may include a communication device-readable medium 1422, on which is stored one or more sets of data structures or instructions 1424 (e.g., software) embodying or utilized by any one or more of the techniques or functions described herein. In some aspects, registers of the processor 1402, the main memory 1404, the static memory 1406, and/or the storage device 1407 may be, or include (completely or at least partially), the device-readable medium 1422, on which is stored the one or more sets of data structures or instructions 1424, embodying or utilized by any one or more of the techniques or functions described herein. In an example, one or any combination of the hardware processor 1402, the main memory 1404, the static memory 1406, or the mass storage 1416 may constitute the device-readable medium 1422.

As used herein, the term "device-readable medium" is interchangeable with "computer-readable medium" or "machine-readable medium". While the communication device-readable medium 1422 is illustrated as a single medium, the term "communication device-readable medium" may include a single medium or multiple media (e.g., a centralized or distributed database, and/or associated caches and servers) configured to store the one or more instructions 1424. The term "communication device-readable medium" is inclusive of the terms "machine-readable medium" or "computer-readable medium", and may include any medium that is capable of storing, encoding, or carrying instructions (e.g., instructions 1424) for execution by the communication device 1400 and that causes the communication device 1400 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

Instructions 1424 may further be transmitted or received over a communications network 1426 using a transmission medium via the network interface device 1420 utilizing any one of several transfer protocols. In an example, the network interface device 1420 may include one or more physical jacks (e.g., Ethernet, coaxial, or phone jacks) or one or more antennas to connect to the communications network 1426. In an example, the network interface device 1420 may include a plurality of antennas to wirelessly communicate using at least one of the single-input-multiple-output (SIMO), MIMO, or multiple-input-single-output (MISO) techniques. In some examples, the network interface device 1420 may wirelessly communicate using Multiple User MIMO techniques.

The term "transmission medium" shall be taken to include any intangible medium that is capable of storing, encoding, or carrying instructions for execution by the communication device 1400, and includes digital or analog communications signals or another intangible medium to facilitate communication of such software. In this regard, a transmission medium in the context of this disclosure is a device-readable medium.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Described implementations of the subject matter can include one or more features, alone or in combination as illustrated below by way of examples.

Example 1 is an apparatus for user equipment (UE) configured for operation in a Fifth Generation New Radio (5G NR) network, the apparatus comprising: processing circuitry, wherein to configure the UE for multi-cell scheduling in the 5G NR network, the processing circuitry is to: decode higher layer signaling, the higher layer signaling indicating a number of cell groups configured to the UE, each cell group of the number of cell groups including at least two cells; decode downlink control information (DCI) received in a physical downlink control channel (PDCCH), the DCI including a scheduling grant with time and frequency allocation for a physical uplink shared channel (PUSCH) or a physical downlink shared channel (PDSCH) in the number of cell groups configured to the UE; and schedule uplink data transmissions via the PUSCH in the number of cell groups or schedule downlink data receptions via the PDSCH in the number of cell groups based on the scheduling grant; and a memory coupled to the processing circuitry and configured to store the scheduling grant.

In Example 2, the subject matter of Example 1 includes subject matter where the processing circuitry is to: decode the higher layer signaling to determine a number of cells in each cell group of the number of cell groups; and schedule the uplink data transmissions or the downlink data receptions for the number of cells in each cell group of the number of cell groups.

In Example 3, the subject matter of Examples 1-2 includes subject matter where the processing circuitry is to: decode the DCI to determine a plurality of configuration fields storing configuration information; apply the configuration information to each of the at least two cells in each cell group of the number of cell groups.

In Example 4, the subject matter of Example 3 includes subject matter where the processing circuitry is to: commonly apply the configuration information to the number of cell groups during the scheduled uplink data transmissions or the scheduled downlink data receptions.

In Example 5, the subject matter of Examples 3-4 includes subject matter where one or more the plurality of configuration fields appear N times in the DCI, wherein each field of the plurality of configuration fields appears once for each of the cell groups, and wherein the processing circuitry is to: commonly apply the field to scheduled or valid PDSCHs or PUSCHs in a cell group of the number of cell groups.

In Example 6, the subject matter of Examples 3-5 includes subject matter where one or more the plurality of configuration fields appear M times in the DCI, wherein each field of the plurality of configuration fields is applied for the scheduled uplink data transmissions or the downlink data receptions in a cell, and wherein M is a number of scheduled cells for multi-cell scheduling.

In Example 7, the subject matter of Examples 3-6 includes subject matter where the processing circuitry is to: commonly apply the one or more the plurality of configuration fields for more than one cell of the at least two cells or each cell group of the number of cell groups; and determine a bit-width of the commonly applied one or more the plurality of configuration fields as a maximum bit-width of bit-widths from scheduled cells in a cell group of the number of cell groups based on configuration for the corresponding cells.

In Example 8, the subject matter of Examples 3-7 includes subject matter where the processing circuitry is to: commonly apply the one or more the plurality of configuration fields for more than one cell of the at least two cells or each cell group of the number of cell groups; and determine a bit-width of the commonly applied one or more the plurality of configuration fields as a minimum bit-width of bit-widths from scheduled cells in a cell group of the number of cell groups based on configuration for the corresponding cells.

In Example 9, the subject matter of Examples 3-8 includes subject matter where the processing circuitry is to: commonly apply the one or more the plurality of configuration fields for more than one cell of the at least two cells or each cell group of the number of cell groups; and determine a bit-width of the commonly applied one or more the plurality of configuration fields based on a bit-width of one of the plurality of configuration fields applied to a reference cell selected from scheduled cells or cells in the number of cell groups.

In Example 10, the subject matter of Examples 1-9 includes, transceiver circuitry coupled to the processing circuitry; and one or more antennas coupled to the transceiver circuitry.

Example 11 is a computer-readable storage medium that stores instructions for execution by one or more processors of a base station, the instructions to configure the base station for multi-cell scheduling in a Fifth Generation New Radio (5G NR) network, and to cause the base station to perform operations comprising: encoding higher layer signaling for transmission to a user equipment (UE), the higher layer signaling indicating a number of cell groups configured to the UE, each cell group of the number of cell groups including at least two cells; encoding downlink control information (DCI) for transmission to a user equipment (UE) in a physical downlink control channel (PDCCH), the DCI including a scheduling grant with time and frequency allocation for a physical uplink shared channel (PUSCH) or a physical downlink shared channel (PDSCH) in the number of cell groups configured to the UE; and decoding scheduled uplink data receptions via the PUSCH in the number of cell groups or encode scheduled downlink data transmissions via the PDSCH in the number of cell groups based on the scheduling grant.

In Example 12, the subject matter of Example 11 includes, the operations further comprising: commonly applying modulation and coding scheme (MCS) for the at least two cells in each of the number of cell groups.

Example 13 is a computer-readable storage medium that stores instructions for execution by one or more processors of a user equipment (UE), the instructions to configure the UE for multi-cell scheduling in a Fifth Generation New Radio (5G NR) network, and to cause the UE to perform operations comprising: decoding higher layer signaling, the higher layer signaling indicating a number of cell groups configured to the UE, each cell group of the number of cell groups including at least two cells; decoding downlink control information (DCI) received in a physical downlink control channel (PDCCH), the DCI including a scheduling grant with time and frequency allocation for a physical uplink shared channel (PUSCH) or a physical downlink shared channel (PDSCH) in the number of cell groups configured to the UE; and scheduling uplink data transmissions via the PUSCH in the number of cell groups or schedule downlink data receptions via the PDSCH in the number of cell groups based on the scheduling grant.

In Example 14, the subject matter of Example 13 includes, the operations further comprising: decoding the higher layer signaling to determine a number of cells in each cell group of the number of cell groups; and scheduling the uplink data transmissions or the downlink data receptions for the number of cells in each cell group of the number of cell groups.

In Example 15, the subject matter of Examples 13-14 includes, the operations further comprising: decoding the DCI to determine a plurality of configuration fields storing configuration information; applying the configuration information to each of the at least two cells in each cell group of the number of cell groups.

In Example 16, the subject matter of Example 15 includes, the operations further comprising: commonly applying the configuration information to the number of cell groups during the scheduled uplink data transmissions or the scheduled downlink data receptions.

In Example 17, the subject matter of Examples 15-16 includes subject matter where one or more the plurality of configuration fields appear N times in the DCI, wherein each field of the plurality of configuration fields appears once for each of the cell groups, and the operations further comprising: commonly applying the field to scheduled or valid PDSCHs or PUSCHs in a cell group of the number of cell groups.

In Example 18, the subject matter of Examples 15-17 includes subject matter where one or more the plurality of configuration fields appear M times in the DCI, wherein each field of the plurality of configuration fields is applied for the scheduled uplink data transmissions or the downlink data receptions in a cell, and wherein M is a number of scheduled cells for multi-cell scheduling.

In Example 19, the subject matter of Examples 15-18 includes, the operations further comprising: commonly applying the one or more the plurality of configuration fields for more than one cell of the at least two cells or each cell group of the number of cell groups; and determining a bit-width of the commonly applied one or more the plurality of configuration fields as a maximum bit-width of bit-widths from scheduled cells in a cell group of the number of cell groups based on configuration for the corresponding cells.

In Example 20, the subject matter of Examples 15-19 includes, the operations further comprising: commonly applying the one or more the plurality of configuration fields for more than one cell of the at least two cells or each cell group of the number of cell groups; and determining a bit-width of the commonly applied one or more the plurality of configuration fields as a minimum bit-width of bit-widths from scheduled cells in a cell group of the number of cell groups based on configuration for the corresponding cells.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Although an aspect has been described concerning specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for a user equipment (UE) configured for operation in a fifth-generation new radio (5G NR) network, the apparatus comprising: processing circuitry; and memory, wherein the processing circuitry is configured to:

decode radio-resource control (RRC) signaling comprising a ServingCellConfig information element (IE) indicating a number of cell sets configured to the UE for multi-cell physical downlink shared channel (PDSCH) scheduling and multi-cell physical uplink shared channel (PUSCH) scheduling, the number of cell sets configured to the UE being at least two;

decode a DCI format scheduling multiple PUSCHs in multiple cells, the DCI format indicating a scheduled cell set and scheduled cells in the scheduled cell set, the scheduled cell set being one of the cell sets configured to the UE in the ServingCellConfig IE; and schedule a PUSCH for transmission in each of the scheduled cells of the scheduled cell set, wherein the scheduled cell sets indicated in the DCI format comprises a bit field, and wherein the processing circuitry is configured to map the bit field to an index to determine the scheduled cell set, wherein the configured cell sets configured to the UE by the ServingCellConfig information element (IE) are assigned the index in ascending order based on a cell set ID, and wherein the scheduled cells in the scheduled cell set are indicated in the DCI format by a corresponding entry in the ServingCellConfig information element (IE), wherein the processing circuitry is further configured to decode a DCI format 1_3 scheduling multiple PDSCHs in multiple cells, the DCI 1_3 format indicating a second scheduled cell set and second scheduled cells in the second scheduled cell set, the second scheduled cell set being one of the cell sets configured to the UE in the ServingCellConfig IE, wherein the processing circuitry is configured to schedule reception of a PDSCH in each of the second scheduled cells of the second scheduled cell set, wherein the second scheduled cell set indicated in the DCI format 1_3 comprises a second bit field, and wherein the processing circuitry is configured to map the second bit field to an index to determine the second scheduled cell set.

2. The apparatus of claim 1, wherein the DCI format further includes a CSI request field and wherein the processing circuitry is configured to apply the CSI request field to a scheduled cell of the scheduled cell set with a lowest serving cell index.

3. The apparatus of claim 1, wherein the DCI format further includes a new data indicator and redundancy version, the new data indicator indicating whether each of the scheduled cells of the scheduled cell set has new data, the redundancy version indicating a redundancy version for each of the scheduled cells of the scheduled cell set.

4. The apparatus of claim 1, wherein the second configured cell sets configured to the UE by the ServingCellConfig information element (IE) are assigned the index in ascending order based on the cell set ID, and wherein the scheduled cells in the second scheduled cell set are indicated in the DCI format 1_3 by a corresponding entry in the ServingCellConfig information element (IE).

5. The apparatus of claim 1, wherein the processing circuitry is configured to:

refrain from scheduling a PUSCH for transmission in cells of the scheduled cell set that are not scheduled by the DCI format; and refrain from scheduling a PUSCH for transmission in cells of the cell sets configured to the UE in the ServingCellConfig information element (IE) other than the cell set that is scheduled by the DCI format.

6. A non-transitory computer-readable storage medium that stores instructions for execution by processing circuitry of a user equipment (UE) configured for operation in a fifth-generation new radio (5G NR) network, the processing circuitry is configured to:

decode radio-resource control (RRC) signaling comprising a ServingCellConfig information element (IE) indicating a number of cell sets configured to the UE for multi-cell physical downlink shared channel (PDSCH) scheduling and multi-cell physical uplink shared channel (PUSCH) scheduling, the number of cell sets configured to the UE being at least two, each cell set configurable to include more than one cell;

decode a single DCI format scheduling multiple PUSCHs in multiple cells with one PUSCH per cell, the DCI format indicating a scheduled cell set and scheduled cells in the scheduled cell set, the scheduled cell set being one of the cell sets configured to the UE in the ServingCellConfig IE; and schedule a PUSCH for transmission in each of the scheduled cells of the scheduled cell set, wherein the configured cell sets configured to the UE by the ServingCellConfig IE are assigned an index in ascending order based on a cell set ID, and wherein the scheduled cells in the scheduled cell set are indicated in the DCI format by a corresponding entry in the ServingCellConfig IE, wherein the scheduled cell sets indicated in the DCI format comprises a bit field, and wherein the processing circuitry is configured to map the bit field to an the index to determine the scheduled cell set, wherein the processing circuitry is further configured to decode a DCI format 1_3 scheduling multiple PDSCHs in multiple cells, the DCI 1_3 format indicating a second scheduled cell set and second scheduled cells in the second scheduled cell set, the second scheduled cell set being one of the cell sets configured to the UE in the ServingCellConfig IE, wherein the processing circuitry is configured to schedule reception of a PDSCH in each of the second scheduled cells of the second scheduled cell set, wherein the second scheduled cell set indicated in the DCI format 1_3 comprises a second bit field, and wherein the processing circuitry is configured to map the second bit field to an index to determine the second scheduled cell set.

7. The non-transitory computer-readable storage medium of claim 6, wherein the DCI format further includes a CSI request field and wherein the processing circuitry is configured to apply the CSI request field to a scheduled cell of the scheduled cell set with a lowest serving cell index.

8. The non-transitory computer-readable storage medium of claim 7, wherein the DCI format further includes a new data indicator and redundancy version, the new data indicator indicating whether each of the scheduled cells of the scheduled cell set has new data, the redundancy version indicating a redundancy version for each of the scheduled cells of the scheduled cell set.

9. An apparatus for generation node B (gNB) configured for operation in a fifth-generation new radio (5G NR) network, the apparatus comprising: processing circuitry; and memory, wherein the processing circuitry is configured to:

encode radio-resource control (RRC) signaling for transmission to a user equipment (UE) comprising a ServingCellConfig information element (IE) indicating a number of cell sets configured to the UE for multi-cell physical downlink shared channel (PDSCH) scheduling and multi-cell physical uplink shared channel (PUSCH) scheduling, the number of cell sets configured to the UE being at least two, each cell set configurable to include more than one cell;

encode a single DCI format for transmission to the UE scheduling multiple PUSCHs in multiple cells with one PUSCH per cell, the DCI format indicating a scheduled cell set and scheduled cells in the scheduled cell set, the scheduled cell set being one of the cell sets configured to the UE in the ServingCellConfig IE; and decode a PUSCH transmission scheduled by the UE in each of the scheduled cells of the scheduled cell set, wherein the configured cell sets configured to the UE by the ServingCellConfig IE are assigned an index in ascending order based on a cell set ID, and wherein the scheduled cells in the scheduled cell set are indicated in the DCI format by a corresponding entry in the ServingCellConfig IE, wherein the scheduled cell sets indicated in the DCI format comprises a bit field for use by the UE to map the bit field to an index to determine the scheduled cell set, wherein the processing circuitry is further configured to encode a DCI format 1_3 scheduling multiple PDSCHs in multiple cells for transmission to the UE, the DCI 1_3 format indicating a second scheduled cell set and second scheduled cells in the second scheduled cell set, the second scheduled cell set being one of the cell sets configured to the UE in the ServingCellConfig IE, wherein the processing circuitry is configured to schedule transmission of a PDSCH in each of the second scheduled cells of the second scheduled cell set, wherein the second scheduled cell set indicated in the DCI format 1_3 comprises a second bit field, and wherein the second bit field is mapped to an index to determine the second scheduled cell set.

* * * * *